United States Patent
Negishi et al.

(10) Patent No.: US 10,567,852 B2
(45) Date of Patent: Feb. 18, 2020

(54) TRANSMISSION DEVICE, TRANSMISSION METHOD, RECEPTION DEVICE, RECEPTION METHOD, AND PROGRAM

(71) Applicant: Sony Corporation, Tokyo (JP)

(72) Inventors: Shinji Negishi, Kanagawa (JP); Takehito Watanabe, Tokyo (JP); Kazuhiro Ishigaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 122 days.

(21) Appl. No.: 15/735,667

(22) PCT Filed: Jul. 7, 2016

(86) PCT No.: PCT/JP2016/070084
§ 371 (c)(1),
(2) Date: Dec. 12, 2017

(87) PCT Pub. No.: WO2017/014054
PCT Pub. Date: Jan. 26, 2017

(65) Prior Publication Data
US 2019/0230420 A1   Jul. 25, 2019

(30) Foreign Application Priority Data
Jul. 21, 2015 (JP) ................................ 2015-144419

(51) Int. Cl.
*H04N 21/00* (2011.01)
*H04N 21/8547* (2011.01)
(Continued)

(52) U.S. Cl.
CPC ..... *H04N 21/8547* (2013.01); *H04N 21/2368* (2013.01); *H04N 21/242* (2013.01); *H04N 21/26291* (2013.01); *H04N 21/4305* (2013.01)

(58) Field of Classification Search
CPC .......... H04N 21/8547; H04N 21/2368; H04N 21/242; H04N 21/26291; H04N 21/4305
See application file for complete search history.

(56) References Cited

U.S. PATENT DOCUMENTS 6,137,834 A * 10/2000 Wine ................. H04N 21/2187
375/240
7,298,741 B2 * 11/2007 Hung ............... H04N 21/23608
370/389

(Continued)

FOREIGN PATENT DOCUMENTS

| JP | 2015-015759 A | 1/2015 |
|---|---|---|
| JP | 5672407 B2 | 1/2015 |
| WO | 2015/001783 A1 | 1/2015 |

OTHER PUBLICATIONS

"MMT-Based Media Transport Scheme in Digital Broadcasting Systems," ARIB STD-B60 Version 1.2, [online], Mar. 17, 2015.

*Primary Examiner* — Zhihan Zhou
(74) *Attorney, Agent, or Firm* — Michael Best & Friedrich LLP

(57) ABSTRACT

The present technology relates to a transmission device, a transmission method, a reception device, a reception method, and a program that allow to make a change dynamically in time stamps which are already transmitted. The transmission device transmits time stamps in a same MPU in which a change is made from already transmitted time stamps so that the time stamps can be received before decoding is started. When the time stamps in the same MPU including the change are received, the reception device updates the time stamps in a time stamp memory and can dynamically change the time stamps since decoding is performed according to the updated time stamps. The present technology can be applied to the transmission device and the reception device.

12 Claims, 28 Drawing Sheets

(51) Int. Cl.
*H04N 21/2368* (2011.01)
*H04N 21/242* (2011.01)
*H04N 21/262* (2011.01)
*H04N 21/43* (2011.01)

(56) References Cited

U.S. PATENT DOCUMENTS

| | | | |
|---|---|---|---|
| 2016/0078901 A1* | 3/2016 | Toma | H04N 21/643 386/355 |
| 2016/0295257 A1* | 10/2016 | Iguchi | H04N 5/38 |
| 2016/0302193 A1* | 10/2016 | Rabii | H04N 21/43637 |
| 2017/0359611 A1* | 12/2017 | Iguchi | H04N 21/242 |

\* cited by examiner

FIG. 20

| | Syntax | No. of Bits | Format |
|---|---|---|---|
| 1 | MPU_Extended_Timestamp_Descriptor () { | | |
| 2 | descriptor_tag | 16 | uimsbf |
| 3 | descriptor_length | 8 | uimsbf |
| 4 | reserved | 5 | bslbf |
| 5 | pts_offset_type | 2 | uimsbf |
| 6 | timescale_flag | 1 | bslbf |
| 7 | if(timescale_flag == 1) { | | |
| 8 | timescale | 32 | uimsbf |
| 9 | } | | |
| 10 | if(pts_offset_type == 1) { | | |
| 11 | default_pts_offset | 16 | uimsbf |
| 12 | } | | |
| 13 | for(i=0;i<N;i++) { | | |
| 14 | mpu_sequence_number | 32 | uimsbf |
| 15 | mpu_decoding_time_offset | 16 | uimsbf |
| 16 | num_of_au | 8 | uimsbf |
| 17 | for(j=0;j<num_of_au;j++) { | | |
| 18 | dts_pts_offset | 16 | uimsbf |
| 19 | if(pts_offset_type == 2) { | | |
| 20 | pts_offset | 16 | uimsbf |
| 21 | } | | |
| 22 | } | | |
| 23 | } | | |
| 24 | } | | |

Rows 14–20: TIME STAMP INFORMATION PART OF EACH MPU

FIG. 21

| | Syntax | No. of Bits | Format |
|---|---|---|---|
| 1 | for (i=0;i<N;i++) { | | |
| 2 | mpu_sequence_number | 32 | uimsbf |
| 3 | mpu_decoding_time_offset | 16 | uimsbf |
| 4 | num_of_au | 8 | uimsbf |
| 5 | for (j=0;j<num_of_au;j++) { | | |
| 6 | reserved | 7 | bslbf |
| 7 | valid_flag | 1 | bslbf |
| 8 | if(valid_flag == 1) { | | |
| 9 | dts_pts_offset | 16 | uimsbf |
| 10 | if(pts_offset_type == 2) { | | |
| 11 | pts_offset | 16 | uimsbf |
| 12 | } | | |
| 13 | } | | |
| 14 | } | | |
| 15 | } | | |

FIG. 23

| Syntax | | No. of Bits | Format |
|---|---|---|---|
| 1 | for (i=0;i<N;i++) { | | |
| 2 | mpu_sequence_number | 32 | uimsbf |
| 3 | mpu_decoding_time_offset | 16 | uimsbf |
| 4 | num_of_au | 8 | uimsbf |
| 5 | for (j=0;j<num_of_au;j++) { | | |
| 6 | reserved | 7 | bslbf |
| 7 | valid_flag | 1 | bslbf |
| 8 | dts_pts_offset | 16 | uimsbf |
| 9 | if(pts_offset_type == 2) { | | |
| 10 | pts_offset | 16 | uimsbf |
| 11 | } | | |
| 12 | } | | |
| 13 | } | | |

FIG. 24

| | Syntax | No. of Bits | Format |
|---|---|---|---|
| 1 | for (i=0;i<N;i++) { | | |
| 2 | mpu_sequence_number | 32 | uimsbf |
| 3 | mpu_decoding_time_offset | 16 | uimsbf |
| 4 | num_of_au_in_mpu | 8 | uimsbf |
| 5 | num_of_au | 8 | uimsbf |
| 6 | for (j=0;j<num_of_au;j++) { | | |
| 7 | dts_pts_offset | 16 | uimsbf |
| 8 | if(pts_offset_type == 2) { | | |
| 9 | pts_offset | 16 | uimsbf |
| 10 | } | | |
| 11 | } | | |
| 12 | } | | |

*FIG. 25*

| | Syntax | No. of Bits | Format |
|---|---|---|---|
| 1 | for (i=0;i<N;i++) { | | |
| 2 | mpu_sequence_number | 32 | uimsbf |
| 3 | mpu_decoding_time_offset | 16 | uimsbf |
| 4 | num_of_au | 8 | uimsbf |
| 5 | num_of_valid_au | 8 | uimsbf |
| 6 | for (j=0;j<num_of_valid_au;j++) { | | |
| 7 | dts_pts_offset | 16 | uimsbf |
| 8 | if(pts_offset_type == 2) { | | |
| 9 | pts_offset | 16 | uimsbf |
| 10 | } | | |
| 11 | } | | |
| 12 | } | | |

FIG. 26

| Syntax | No. of Bits | Format |
|---|---|---|
| for (i=0;i<N;i++) { | | |
| mpu_sequence_number | 32 | uimsbf |
| reserved | 7 | bslbf |
| update_flag | 1 | bslbf |
| mpu_decoding_time_offset | 16 | uimsbf |
| num_of_au | 8 | uimsbf |
| for (j=0;j<num_of_au;j++) { | | |
| dts_pts_offset | 16 | uimsbf |
| if(pts_offset_type == 2) { | | |
| pts_offset | 16 | uimsbf |
| } | | |
| } | | |
| } | | |

*FIG. 27*

| Syntax | | No. of Bits | Format |
|---|---|---|---|
| 1 | for (i=0;i<N;i++) { | | |
| 2 | mpu_sequence_number | 32 | uimsbf |
| 3 | reserved | 7 | bslbf |
| 4 | complete_flag | 1 | bslbf |
| 5 | mpu_decoding_time_offset | 16 | uimsbf |
| 6 | num_of_au | 8 | uimsbf |
| 7 | for (j=0;j<num_of_au;j++) { | | |
| 8 | dts_pts_offset | 16 | uimsbf |
| 9 | if(pts_offset_type == 2) { | | |
| 10 | pts_offset | 16 | uimsbf |
| 11 | } | | |
| 12 | } | | |
| 13 | } | | |

TRANSMISSION DEVICE, TRANSMISSION METHOD, RECEPTION DEVICE, RECEPTION METHOD, AND PROGRAM

TECHNICAL FIELD

The present technology relates to a transmission device, a transmission method, a reception device, a reception method, and a program, and specifically relates to a transmission device that can dynamically change already transmitted time stamps, a transmission method, a reception device, a reception method, and a program thereof.

BACKGROUND ART

Conventionally, in digital broadcasting, for example, Moving Picture Experts Group (MPEG) 2 Transport Stream (TS) defined by ISO 13818-1 is used as a data structure.

Similarly to a picture of a video or an audio frame, a basic unit that time information is associated with is referred to as an access unit.

In MPEG-2 TS, in a case where data of video or audio is packetized, since decoding time and showing time, which are associated with the data on an access unit basis, are encoded in its header part being close to the beginning of the data of an access unit corresponding to the time information on a stream, the decoding time and showing time are easily given with confirmed values.

On the other hand, for example, in a case of Association of Radio Industries and Business (ARIB) STD-B60, which is a standard using MPEG media transport (MMT) defined in MPEG-H Standard Part 1, decoding time and showing time associated with an access unit of video or audio are packetized into a packet different from a packet of video or audio data according to a method using an MMT message (see Patent Document 1).

CITATION LIST

Patent Document

Patent Document 1: Japanese Patent No. 5672407 (Japanese Patent Application Laid-Open No. 2015-015759)

SUMMARY OF THE INVENTION

Problems to be Solved by the Invention

However, according to the above technology, since a plurality of access units of video or audio is set as a group and the decoding time and showing time associated with the access units included in a group are collectively transmitted, the time information of the entire group needs to be confirmed in advance.

Thus, for example, even in a case where a scene change is detected and it is desired to change a video encoding method in order to encode the video with a high-quality level, the decoding time and showing time, which are already transmitted, are kept fixed.

Further, for example, in a case where it is desired to change a border between the groups to insert an edit point, lengths of the groups corresponding to the decoding time and showing time, which are already transmitted, are kept fixed.

The present technology has been made in view of the above problems and specifically allows to dynamically change time stamps, which are already transmitted.

Solutions to Problems

A transmission device according to a first aspect of the present technology includes: a time stamp packetizing unit configured to packetize time stamps into a time stamp packet; an encoding unit configured to encode data associated with the time stamps; a data packetizing unit configured to packetize the coded data encoded by the encoding unit into a data packet; and a multiplexing unit configured to multiplex the time stamp packet and the data packet, generate a multiplexed stream, and transmit the multiplexed stream to a reception device, in which the time stamp packetizing unit packetizes the plurality of time stamps into the time stamp packet on a group basis, the group including the data associated with the plurality of time stamps, and in a case where a change is made in a group configuration or the time stamps of the group, packetizes the changed group configuration or time stamps of the group into the time stamp packet, and the multiplexing unit retransmits the time stamp packet of the changed group configuration or time stamps of the group to the reception device at a timing so that the time stamp packet is received before the reception device starts to decode the coded data corresponding to the changed group configuration or time stamps of the group.

The time stamp packetizing unit may packetize the data, in the group, which is associated with the plurality of time stamps, into the time stamp packet on a group basis as adding a confirmed time stamp only, and the multiplexing unit may retransmit, to the reception device, the time stamp packet to which only the confirmed time stamp in the group is added, at a timing so that the time stamp packet is received before the reception device starts to decode the coded data corresponding to the time stamps of the group.

In a case where there is an unconfirmed time stamp in the group of the data associated with the plurality of time stamps, the time stamp packetizing unit may packetize the data into the time stamp packet as adding information that indicates the unconfirmed time stamp, and the multiplexing unit may retransmit, to the reception device, the time stamp packet including the information that indicates the unconfirmed time stamp in the group, at a timing so that the time stamp packet is received before the reception device starts to decode the coded data corresponding to the time stamps of the group.

The time stamp packetizing unit may packetize the time stamps in the group of the data associated with the plurality of time stamps into the time stamp packet as including information indicating presence, absence, or completion of an update of the time stamps, and the multiplexing unit may packetize the time stamps of the group into the time stamp packet including the information indicating the presence, absence or completion of the update of the time stamps and retransmit, to the reception device, the time stamp packet at a timing so that the time stamp packet is received before the reception device starts to decode the coded data corresponding to the time stamps of the group.

The multiplexing unit may retransmit, to the reception device, the time stamp packet of the group configuration or the time stamps in the group where a change or an addition has been made, at a timing so that the time stamp packet is received at timing a predetermined period of time prior to the timing when the reception device starts to decode the coded data corresponding to the group configuration or time stamp of the group where the change or addition has been made.

A transmission method according to the first aspect of the present technology includes steps of: packetizing time stamps into a time stamp packet; encoding data associated with the time stamps; packetizing the coded data encoded by the encoding unit into a data packet; multiplexing the time stamp packet and the data packet, generating a multiplexed stream, and transmitting the multiplexed stream to a reception device, in which in a process of the time stamp packetizing step for packetizing the time stamps into the time stamp packet, the plurality of time stamps are packetized into the time stamp packet on a group basis, the group including the data associated with the plurality of time stamps, and in a case where a change is made in a group configuration or the time stamps of the group, the changed group configuration or time stamps of the group is packetized into the time stamp packet, and in a process of the step for generating the multiplexed stream and transmitting the multiplexed stream to the reception device, the time stamp packet of the changed group configuration or time stamps of the group is retransmitted to the reception device at a timing so that the time stamp packet is received before the reception device starts to decode the coded data corresponding to the changed group configuration or timestamps of the group.

A program according to the first aspect of the present technology is a program that causes a computer to execute: a time stamp packetizing unit configured to packetize time stamps into a time stamp packet; an encoding unit configured to encode data associated with the time stamps; a data packetizing unit configured to packetize the coded data encoded by the encoding unit into a data packet; and a multiplexing unit configured to multiplex the time stamp packet and the data packet, generate a multiplexed stream, and transmit the multiplexed stream to a reception device, in which the time stamp packetizing unit packetizes the plurality of time stamps into the time stamp packet on a group basis, the group including the data associated with the plurality of time stamps, and in a case where a change is made in a group configuration or the time stamp of the group, packetizes the changed group configuration or time stamps of the group into the time stamp packet, and the multiplexing unit retransmits the time stamp packet of the changed group configuration or time stamps of the group to the reception device at a timing so that the time stamp packet is received before the reception device starts to decode the coded data corresponding to the changed group configuration or time stamps of the group.

According to the first aspect of the present technology, time stamps are packetized into a time stamp packet, data associated with the time stamps is encoded, the coded data is packetized into a data packet, the time stamp packet and the data packet are multiplexed, a multiplexed stream is generated and transmitted to a reception device, the plurality of time stamps are packetized into the time stamp packet on a group basis as assuming that the group includes the data associated with the plurality of time stamps, a changed group configuration or time stamps of the group is packetized into the time stamp packet in a case where a change is made in the group configuration or the time stamps of the group, and the time stamp packet of the changed group configuration or time stamps of the group is retransmitted to a reception device at a timing so that the time stamp packet is received before the reception device starts to decode the coded data corresponding to the changed group configuration or time stamps of the group.

A reception device according to the second aspect of the present technology is a reception device that receives a multiplexed stream transmitted from a transmission device including: a time stamp packetizing unit configured to packetize time stamps into a time stamp packet; an encoding unit configured to encode data associated with the time stamps; a data packetizing unit configured to packetize the coded data encoded by the encoding unit into a data packet; and a multiplexing unit configured to multiplex the time stamp packet and the data packet, generate a multiplexed stream, and transmit the multiplexed stream to the reception device, in which the time stamp packetizing unit packetizes the plurality of time stamps into the time stamp packet on a group basis, the group including the data associated with the plurality of time stamps, and in a case where a change is made in a group configuration or the time stamps of the group, packetizes the changed group configuration or time stamps of the group into the time stamp packet, and the multiplexing unit retransmits the time stamp packet of the changed group configuration or time stamps of the group to the reception device at a timing so that the time stamp packet is received before the reception device starts to decode the coded data corresponding to the changed group configuration or time stamps of the group, the reception device including: a separating unit configured to separate the multiplexed stream into the time stamps and the coded data associated with the time stamps; a time stamp storing unit configured to store the time stamps; an update management unit configured to manage an update of the time stamps stored in the time stamp storing unit; a decoding unit configured to decode the coded data associated with the time stamps, which is separated by the separating unit; and a synchronization control unit configured to control a timing to decode the coded data associated with the time stamps and a timing to show the decoded data associated with the time stamps, on the basis of information of the time stamps stored in the time stamp storing unit, in which in a case where the retransmitted time stamp is transmitted, the update management unit updates the time stamps stored in the time stamp storing unit with the undecoded time stamp among the time stamps in the group based on the retransmitted time stamp and stores the time stamps, and the synchronization control unit controls the timing to decode the coded data associated with the time stamps and the timing to show the decoded data associated with the time stamps, on the basis of the time stamps updated and stored in the time stamp storing unit.

In a case where the retransmitted time stamp is transmitted and a change has been made in an undecoded or unshown time stamp among the time stamps in the group, the update management unit may update and store the time stamps stored in the time stamp storing unit on the basis of the retransmitted time stamp.

In a case where the time stamps, in which only a confirmed time stamp is added, are transmitted, the update management unit may update and store the time stamps stored in the time stamp storing unit, on the basis of the added time stamp among the time stamps in the group.

A reception method according to the second aspect of the present technology is a reception method of a reception device that receives a multiplexed stream transmitted from a transmission device including: a time stamp packetizing unit configured to packetize time stamps into a time stamp packet; an encoding unit configured to encode data associated with the time stamps; a data packetizing unit configured to packetize the coded data encoded by the encoding unit into a data packet; and a multiplexing unit configured to multiplex the time stamp packet and the data packet, generate a multiplexed stream, and transmit the multiplexed stream to the reception device, in which the time stamp packetizing unit packetizes the plurality of time stamps into the time stamp packet on a group basis, the group including the data associated with the plurality of time stamps, and in a case where a change is made in a group configuration or the time stamps of the group, packetizes the changed group configuration or time stamps of the group into the time stamp packet, and the multiplexing unit retransmits the time stamp packet of the changed group configuration or time stamps of the group to the reception device at a timing so that the time stamp packet is received before the reception device starts to decode the coded data corresponding to the changed group configuration or time stamps of the group, the reception method including steps of: separating, from the multiplexed stream, the time stamps and the data which is encoded and associated with the time stamps; storing the time stamps; managing an update of the stored time stamps; decoding the coded data which is separated by the separating unit and associated with the time stamps; and controlling a timing to decode the coded data associated with the time stamps and a timing to show the decoded data associated with the time stamps, on the basis of information of the stored time stamps, in which in a case where the retransmitted time stamp is transmitted, in a process of the managing step for managing an update of the stored time stamps, the undecoded time stamp among the time stamps in the group is stored by updating the stored time stamps on the basis of the retransmitted time stamp, and in a process of the controlling step for controlling the timings, the timing to decode the coded data associated with the time stamps and the timing to show the decoded data associated with the time stamps are controlled on the basis of the updated and stored time stamps.

A program according to the second aspect of the present technology is a program in a computer that controls a reception device that receives a multiplexed stream transmitted from a transmission device including: a time stamp packetizing unit configured to packetize time stamps into a time stamp packet; an encoding unit configured to encode data associated with the time stamps; a data packetizing unit configured to packetize the coded data encoded by the encoding unit into a data packet; and a multiplexing unit configured to multiplex the time stamp packet and the data packet, generate a multiplexed stream, and transmit the multiplexed stream to the reception device, in which the time stamp packetizing unit packetizes the plurality of time stamps into the time stamp packet on a group basis, the group including the data associated with the plurality of time stamps, and in a case where a change is made in a group configuration or the time stamps in the group, packetizes the changed group configuration or time stamps of the group into the time stamp packet, and the multiplexing unit retransmits the time stamp packet of the changed group configuration or time stamps in the group to the reception device at a timing so that the time stamp packet is received before the reception device starts to decode the coded data corresponding to the change group configuration or time stamps of the group, the program causing the computer to operate as functions including: a separating unit configured to separate the multiplexed stream into the time stamps and the coded data associated with the time stamps; a time stamp storing unit configured to store the time stamps; an update management unit configured to manage an update of the time stamps stored in the time stamp storing unit; a decoding unit configured to decode the coded data associated with the time stamps, which is separated by the separating unit; and a synchronization control unit configured to control a timing to decode the coded data associated with the time stamps and a timing to show the decoded data associated with the time stamps, on the basis of information of the time stamps stored in the time stamp storing unit, in which in a case where the retransmitted time stamp is transmitted, the update management unit updates the time stamps stored in the time stamp storing unit with the undecoded time stamp among the time stamps in the group based on the retransmitted time stamp and stores the time stamps, and the synchronization control unit controls the timing to decode the coded data associated with the time stamps and the timing to show the decoded data associated with the time stamps, on the basis of the time stamps updated and stored in the time stamp storing unit.

According to the second aspect of the present technology, a reception device receives a multiplexed stream transmitted from a transmission device in which time stamps are packetized into a time stamp packet, data associated with the time stamps is encoded, the coded data is packetized into a data packet, the time stamp packet and the data packet are multiplexed, a multiplexed stream is generated and transmitted to the reception device, the plurality of time stamps are packetized into the time stamp packet on a group basis as assuming that the group includes the data associated with the plurality of time stamps, a changed group configuration or time stamps of the group is packetized into the time stamp packet in a case where a change is made in the group configuration or the time stamps of the group, and the time stamp packet of the changed group configuration or time stamps of the group is retransmitted to the reception device at a timing so that the time stamp packet is received before the reception device starts to decode the coded data corresponding to the changed group configuration or the time stamp in the group; and, in the reception device, the multiplexed stream is separated into the time stamps and the data which is encoded and associated with the time stamps, the time stamps are stored, an update of the stored time stamps is managed, the coded data which has been separated and is associated with the time stamps is decoded, a timing to decode the coded data associated with the time stamps and a timing to show the decoded data associated with the time stamps are controlled on the basis of information of the stored time stamps, the undecoded time stamp among the time stamps in the group is stored by updating the stored time stamps on the basis of a retransmitted time stamp in a case where the retransmitted time stamp is transmitted, and the timing to decode the coded data associated with the time stamps and the timing to show the decoded data associated with the time stamps are controlled on the basis of the updated and stored time stamps.

The transmission device according to the first aspect of the present technology and the reception device according to the second aspect of the present technology may be provided as independent devices or may be provided as blocks that serve as the transmission device according to the first aspect and the reception device according to the second aspect.

Effects of the Invention

According to an aspect of the present technology, time stamps which are already transmitted can be dynamically changed.

BRIEF DESCRIPTION OF DRAWINGS

FIG. 20 is a diagram explaining a syntax of a common MPU extended time stamp descriptor.

FIG. 21 is a diagram explaining a syntax example of an MPU extended time stamp descriptor that realizes the transmission process of FIG. 19.

FIG. 23 is a diagram explaining a first modification of the syntax of the MPU extended time stamp descriptor that realizes the transmission process of FIG. 19.

FIG. 24 is a diagram explaining a second modification of the syntax of the MPU extended time stamp descriptor that realizes the transmission process of FIG. 19.

FIG. 25 is a diagram explaining a third modification of the syntax of the MPU extended time stamp descriptor that realizes the transmission process of FIG. 19.

FIG. 26 is a diagram explaining a fourth modification of the syntax of the MPU extended time stamp descriptor in a case where information that indicates presence or absence of an update of time stamps is included.

FIG. 27 is a diagram explaining a fourth modification of the syntax of the MPU extended time stamp descriptor in a case where information that indicates completion of the time stamps is included.

MODE FOR CARRYING OUT THE INVENTION

First Embodiment

First Embodiment of Transmission Device

Figure 1:
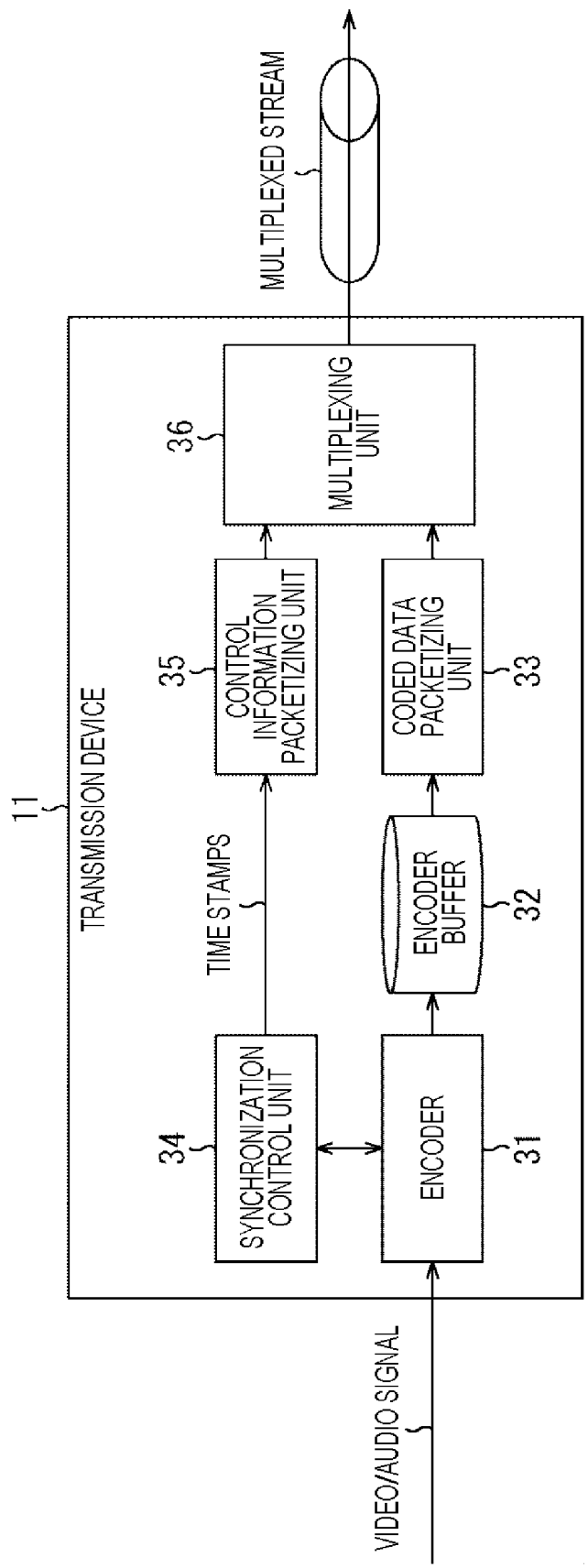
FIG. 1 is a diagram explaining an exemplary configuration of a first embodiment of a transmission device to which the present technology is applied.

With reference to FIG. 1, an exemplary configuration of a first embodiment of a transmission device to which the present technology is applied will be described. The transmission device of FIG. 1 separately packetizes video/audio data with which decoding time and showing time are associated and time stamps including the decoding time and showing time. It is noted that, in the following, the decoding time and showing time are also referred to as decoding/showing time.

The transmission device 11 includes an encoder 31, an encoder buffer 32, a coded data packetizing unit 33, a synchronization control unit 34, a control information packetizing unit 35, and a multiplexing unit 36.

The encoder 31 generates coded data including a coded signal by encoding video/audio data including video data and audio data from a video/audio signal, and the coded data is output to the encoder buffer 32 and temporarily stored (buffered).

The encoder data packetizing unit 33 sequentially reads encoder data from the coded signal buffered in the encoder buffer 32, packetizes the data, and outputs the packet to the multiplexing unit 36.

The synchronization control unit 34 controls encoding operation in the encoder 31, generates time stamps from decoding/showing time of the coded data including the coded signal, and outputs the time stamps to the control information packetizing unit 35.

The control information packetizing unit 35 generates and packetizes control information including the decoding/showing time including a time stamp including information of the decoding/showing time.

The multiplexing unit 36 multiplexes the packetized video/audio data with the control information including the packetized time stamp including the decoding/showing time and outputs the data as a multiplexed stream.

<Packet Structure Including Video/Audio Signal>

Next, with reference to FIG. 2, a packet structure including video/audio data will be described.

Figure 2:
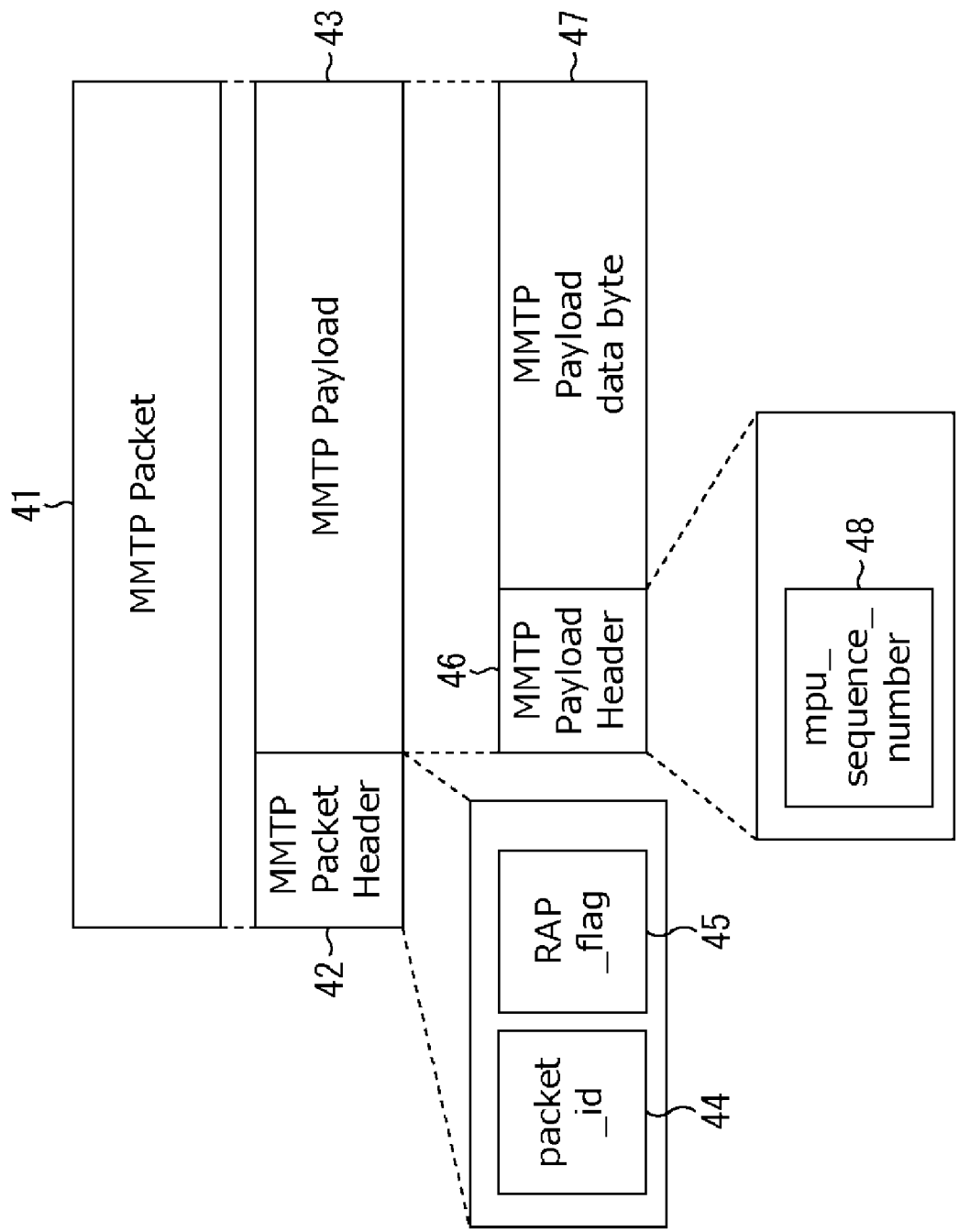
FIG. 2 is a diagram explaining an example of a packet structure of data with which decoding/showing time of MMT is associated.

FIG. 2 illustrates an example of a packet structure of video/audio data with which decoding/showing time of MPEG media transport (MMT) is associated, as an example of a case that the video/audio data with which decoding/showing time is associated and the decoding/showing time are packetized separately.

As illustrated in the top part of FIG. 2, an MMT Protocol (MMTP) Packet 41 includes an MMTP Packet Header 42 including a header part thereof and an MMTP Payload 43 including a payload part thereof.

The MMTP Packet Header 42 includes a packet_id 44 and a RAP_flag 45.

The packet_id 44 includes information to identify a packet string of specific data, which is data in the MMTP Payload 43, in multiplexed packet strings.

The RAP_flag 45 includes information to identify whether or not the MMTP Payload 43 includes a random-access point.

The MMTP Payload 43 includes a Payload Header 46 and a Payload data byte 47. The Payload Header 46 includes an mpu_sequence_number 48, which is a serial number applied to each group called a media progress unit (MPU). Generally, the MPU is placed between random access points in video for example. Here, the Payload data byte 47 will be described in detail later with reference to FIG. 3.

<Structure of Control Information Packet>

Figure 3:
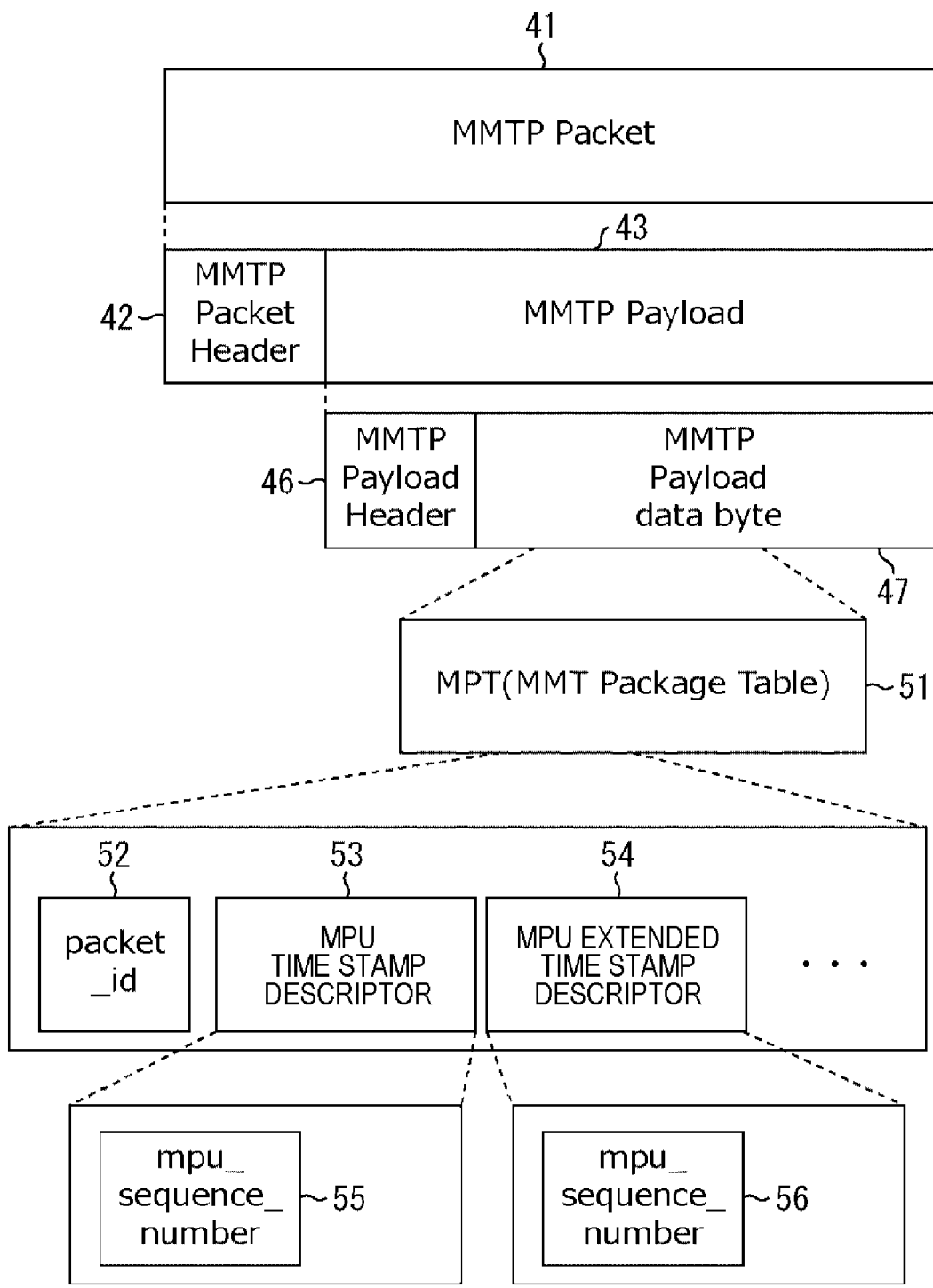
FIG. 3 is a diagram explaining an example of a packet structure of the decoding/showing time of MMT.

Next, with reference to FIG. 3, an exemplary structure of a control information packet including a time stamp including decoding/showing time of a system that uses, in an MMT, an MMT message described in Patent Document 1 as an example that video/audio data with which decoding/showing time is associated and the decoding/showing times are packetized separately.

The information of the decoding/showing time corresponding to the MPU is packetized in an MMT Package Table (MPT) 51 of the MMTP Payload data byte 47 as descriptors called an MPU time stamp descriptor 53 and an MPU extended time stamp descriptor 54.

<Association Between Video/Audio Data Associated with Decoding/Showing Times and Decoding/Showing Times>

Next, with reference to FIG. 4, association between video/audio data associated with a time stamp including decoding/showing time and the decoding/showing time will be described.

A method for associating decoding/showing time in a descriptor included in a control information packet 61 and an MPU included in a video/audio packet 62 included in a video or audio stream will be described.

A packet_id 52 in the control information packet 61 specifies a packet_id 44 of a corresponding video/audio packet 62.

Further, an mpu_sequence_number 55 or 56 in the control information packet 61 specifies an MPU of the mpu_sequence_number 48 of the corresponding video/audio packet 62.

In a case where the RAP_flag 45 indicates a random-access point, the video/audio packet 62 in which the mpu_sequence_number 48 varies can be specified as a first packet associated with the decoding/showing time included in the descriptor.

Figure 4:
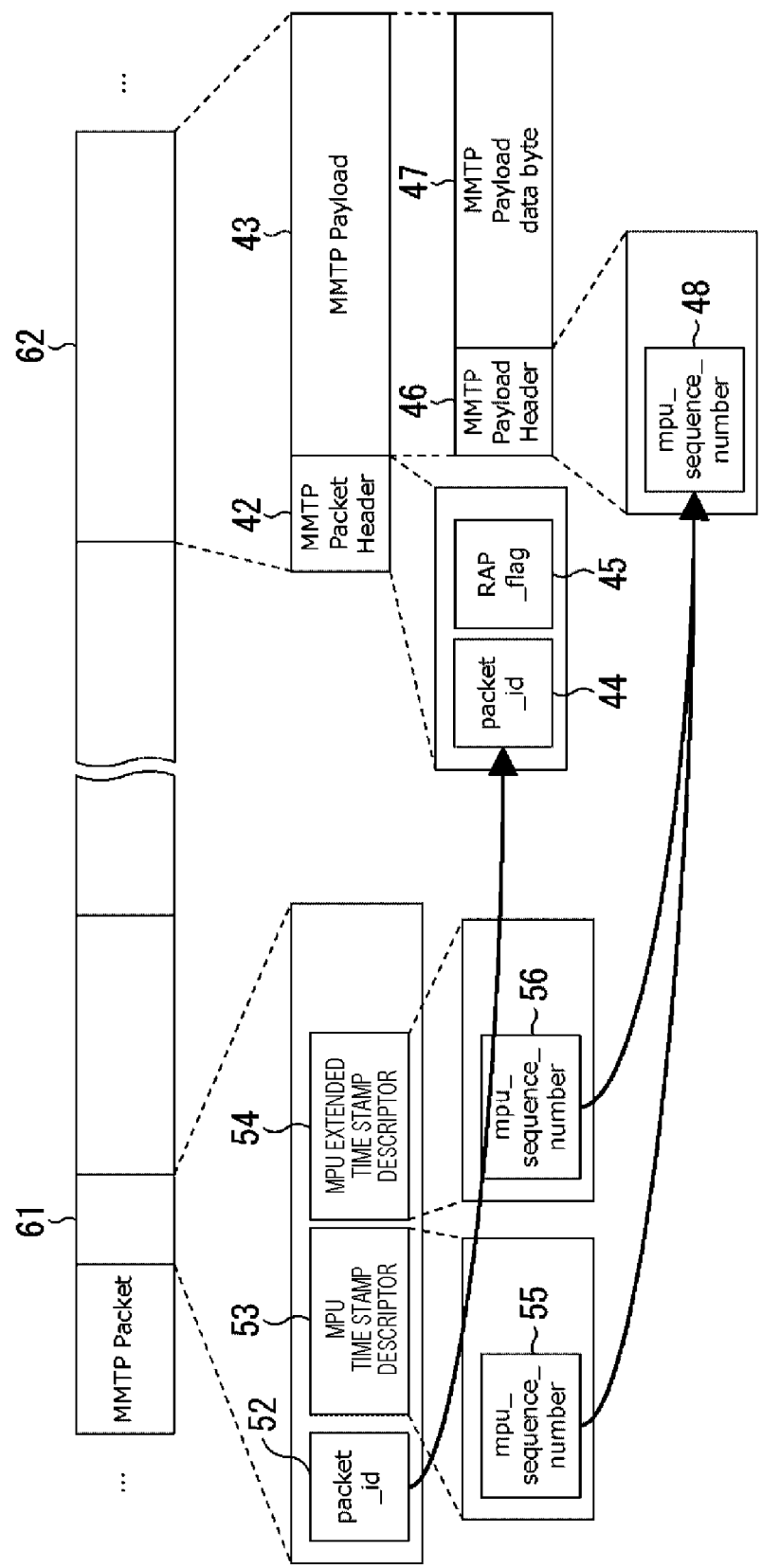
FIG. 4 is a diagram explaining association of the decoding/showing time of MMT.

Here, although FIG. 4 illustrates an example in which an MMTP Packet is multiplexed as an MMTP Packet string; however, there may be a case where the MMTP Packet is multiplexed after being packetized by the Internet protocol or the like (not shown).

<Transmission Process by Transmission Device of FIG. 1>

Next, with reference to a flowchart of FIG. 5, a transmission process by the transmission device 11 of FIG. 1 will be described.

In step S11, the transmission device 11 obtains video/audio data including video and audio.

In step S12, under the control by the synchronization control unit 34, the encoder 31 encodes the video/audio data.

In step S13, the encoder 31 buffers the coded data to the encode buffer 32.

In step S14, the coded data packetizing unit 33 sequentially packetizes the coded data of the video/audio data buffered in the encode buffer 32 and outputs the packets to the multiplexing unit 36.

In step S15, the synchronization control unit 34 outputs information of the video/audio data encoded by the encoder 31 and a time stamp including decoding/showing time to the control information packetizing unit 35.

In step S16, the control information packetizing unit 35 generates control information including a time stamp, and packetizes and outputs the control information to the multiplexing unit 36.

In step S17, the multiplexing unit 36 multiplexes the packetized control information including the time stamp and the packetized video/audio data and transmits the multiplexed data as a multiplexed stream.

In step S18, regarding the processed MPU, the synchronization control unit 34 determines whether or not the video/audio data and control information need to be retransmitted to the same MPU by changing the time stamp or changing the group configuration. In step S18, for example, in a case where a scene change is detected and it is desired to change a video encoding method to encode the video with a high-quality level, and a case where it is desired to change a group border to insert an edit point, or the like, that is, a case where it is needed to retransmit changed video/audio data and the time stamp corresponding to the video/audio data regarding the MPU same with the processed MPU, the process proceeds to step S19.

In step S19, the retransmission is executed. Here, in the retransmission process, the changed video/audio data and the time stamp corresponding to the video/audio data in the MPU same as the processed MPU and, since the processes similarly to steps S11 to S17 are simply executed, the explanation thereof will be omitted.

<Exemplary Configuration of Related Reception Device>

Here, with reference to FIG. 6, a configuration of a related reception device 70 will be explained.

The reception device 70 includes a multiple separation unit 71, an STC management unit 72, a synchronized reproduction control unit 73, a time stamp FIFO 74, buffers 75-1 to 75-n, decoders 76-1 to 76-n, and display units 77-1 to 77-n. Here, in the following, in a case where the respective buffers 75-1 to 75-n, decoders 76-1 to 76-n, and display units 77-1 to 77-n do not need to be particularly distinguished, those components are simply referred to as the buffer 75, decoder 76, and display unit 77 and are also referred to similarly in other configurations.

The multiple separation unit 71 separates only a packet as a reception target from packets in which a plurality of programs or a plurality of pieces of video and audio data are multiplexed. More specifically, the multiple separation unit 71 separates, from an input packet string, packetized video/audio data including clock reference information for restoring a clock in a transmission side, a time stamp including decoding/showing time included in a control packet, and a video/audio packet. Then, the multiple separation unit 71 provides the clock reference information to the STC management unit 72, provides the time stamp to the time stamp FIFO 74, and provides the separated packet of the video/audio data to the buffer 75.

As the clock reference information, Network Time Protocol (NTP) is used in a case of ARIB-STD-B60 as a standard using an MPEG Media Transport (MMT) which is defined in MPEG-H standard, Part 1.

The system time clock (STC) management unit 72 generates a current system time STC on the basis of the clock reference information and provides the current system time STC to the synchronized reproduction control unit 73.

The synchronized reproduction control unit 73 decodes the video/audio data stored in the buffer 75 by controlling the decoder 76 in synchronization with the system time STC provided from the STC management unit 72, on the basis of information of the time stamp stored in the time stamp First In First Out (FIFO) 74 and displays the decoded video/audio data on the display unit 77.

The time stamp FIFO 74 sequentially stores time stamps provided from the multiple separation unit 71, sequentially deletes oldest time stamps, and provides the time stamps in response to a request from the synchronized reproduction control unit 73.

The buffers 75-1 and 75-n sequentially store video/audio data for each channel and, accordingly, provide the data to the decoders 76-1 to 76-n accordingly.

At decoding the time of the time stamp, the decoders 76-1 to 76-n are controlled by the synchronized reproduction control unit 73 to decode the video/audio data encoded for each channel, and restores as video and audio to output the data to the display unit 77. At the showing time of the time stamp, the display unit 77 is controlled by the synchronized reproduction control unit 73, displays the decoded video and outputs audio as a sound respectively.

<Reception Method of Related Reception Device>

In other words, regarding the time stamps, the time stamp FIFO 74 stores, at time t1, control information 81-N including a time stamp of MPU indicated by a number N, which is indicated by mpu_seq(N), and at following time t2, control information 81-(N+1) including a time stamp of MPU indicated by a number (N+1), which is indicated by mpu_seq(N+1) is stored.

Figure 7:
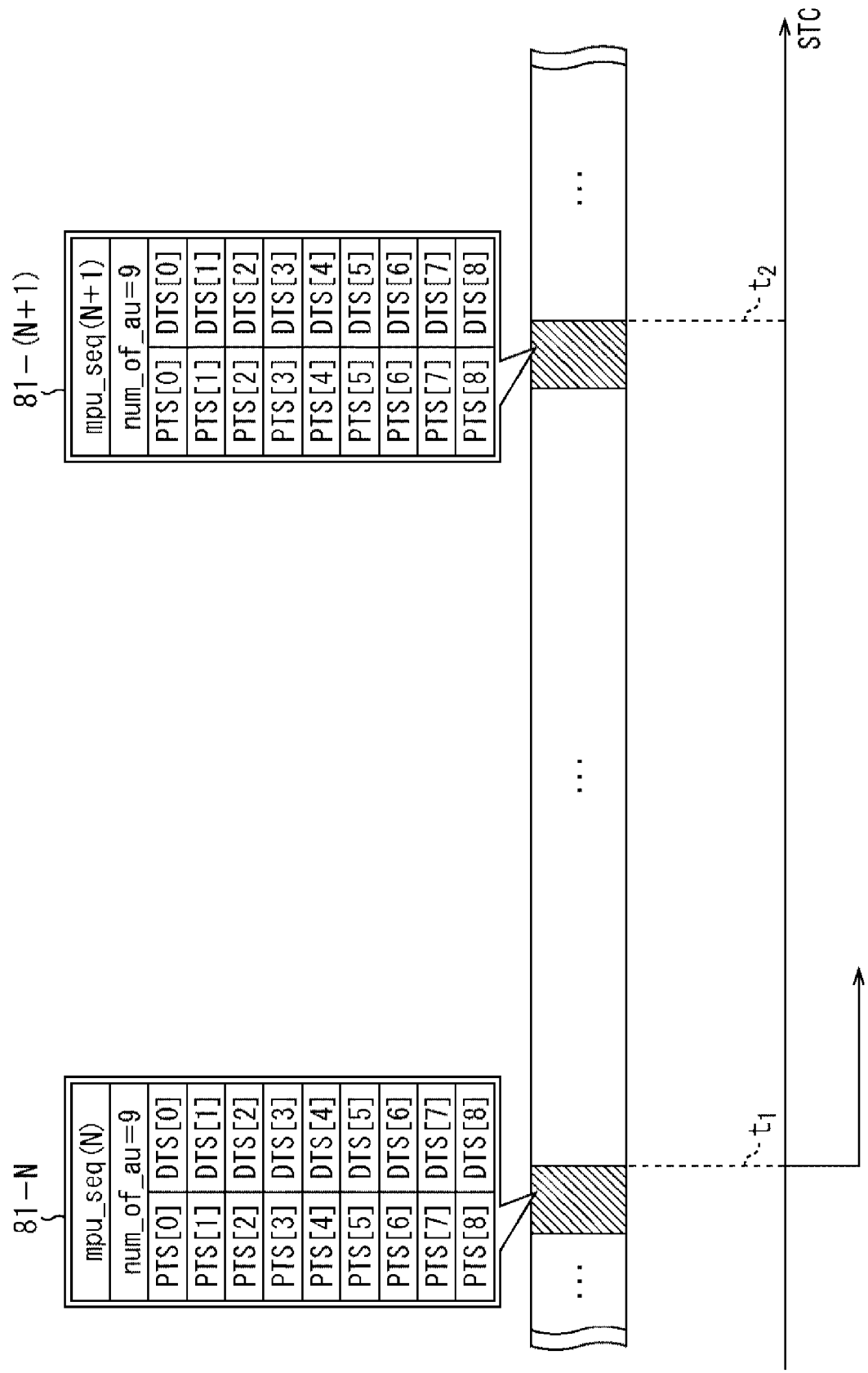
FIG. 7 is a diagram illustrating an exemplary configuration of a first embodiment of a reception device to which the present technology is applied.

Here, as illustrated in FIG. 7, in the control information 81-N including the time stamp, mpu_seq(N) and mpu_of_au=9 are written in order from the top and PTS[0] to PTS[8] and DTS[0] to DTS[8] are written in right and left, a sequence number of the MPU is N, there are nine access units AU (frames) that composes the MPU, showing time for all nine access units AU (frames) is recorded in PTS[0] to PTS[8] respectively in chronological order, and decoding time for all nine access units AU (frames) are recorded in DTS[0] to DTS[8] respectively in chronological order.

Further, since the control information 81-(N+1) in FIG. 7 is similar to the control information 81-N except for that the sequence number of the MPU is incremented by one, the explanation thereof will be omitted.

Further, in the middle part in FIG. 7, the multiplexed stream is illustrated as being associated with the STC in the lower part, and the shaded areas in these parts represent control information 81-N and 81-(N+1) from the left in order.

In this manner, the related reception device 70 newly stores only new time stamps in chronological order and cannot update the time stamps, which are already transmitted. In other words, for example, in a case where a scene change is detected and it is desired to change a video encoding method for encoding video with a high-quality level, a case where it is desired to change a group border to insert an edit point, or the like, the retransmission process in above step S18 cannot be handled.

First Embodiment of Reception Device

Figure 5:
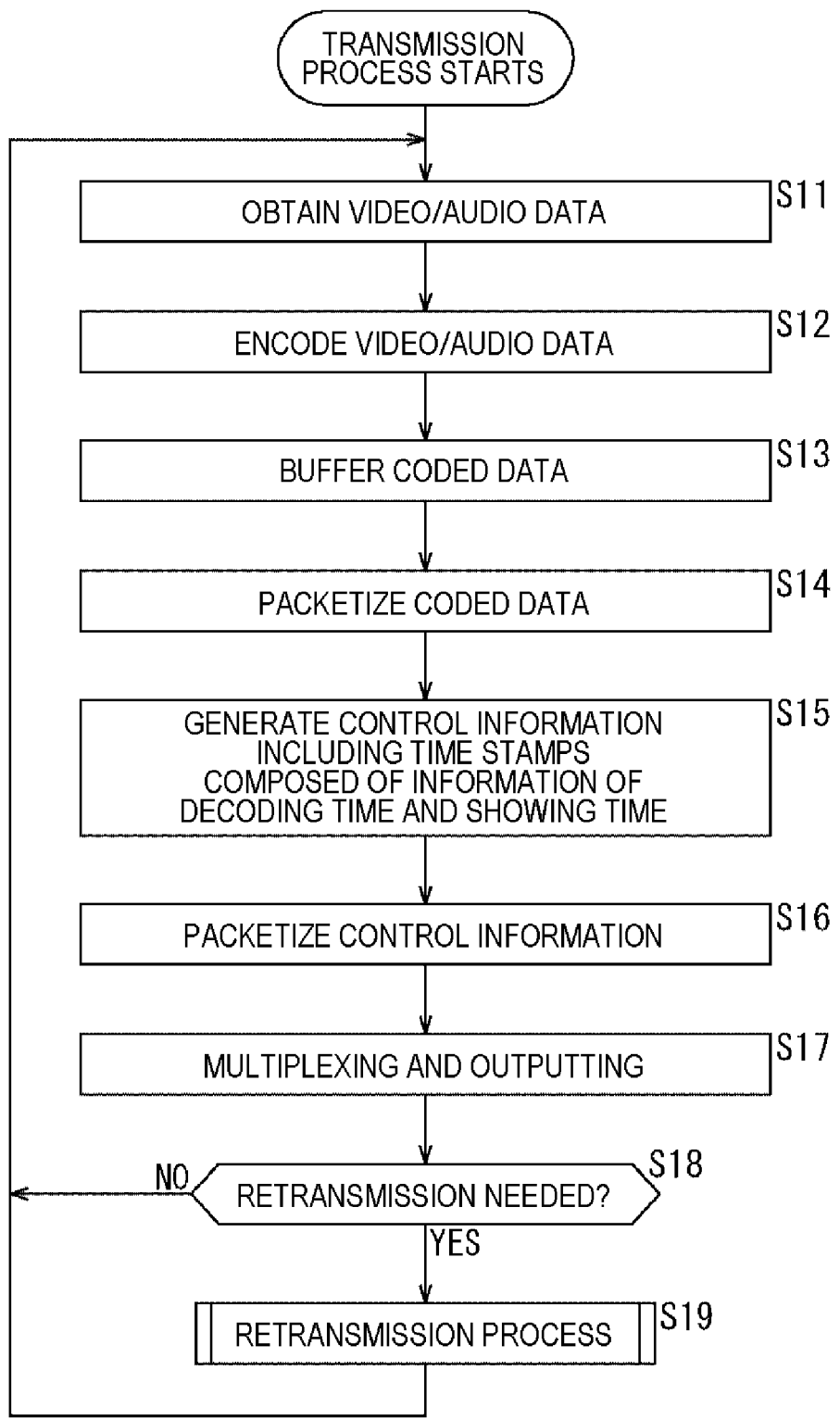
FIG. 5 is a flowchart explaining a transmission process by the transmission device of FIG. 1.

As described above, in a case where a scene change is detected and it is desired to change the video encoding method for encoding video with a high-quality level, a case where it is desired to change a group border to insert an edit point, or the like, that is, a case where it is needed to update the video/audio data and time stamps, the transmission device performs a retransmission process by generating control information including information of a time stamp including decoding/showing time corresponding to the changed video/audio data (see step S19 of FIG. 5).

Then, with reference to FIG. 8, an exemplary configuration of a first embodiment of a reception device, which is applied with the present technology and can handle the retransmission process, will be described. Here, in the reception device 70 of FIG. 8, a configuration having a function same as the configuration of the reception device 70 of FIG. 6 will be applied with the same name and the same reference sign, and the explanation thereof will be appropriately omitted.

Figure 6:
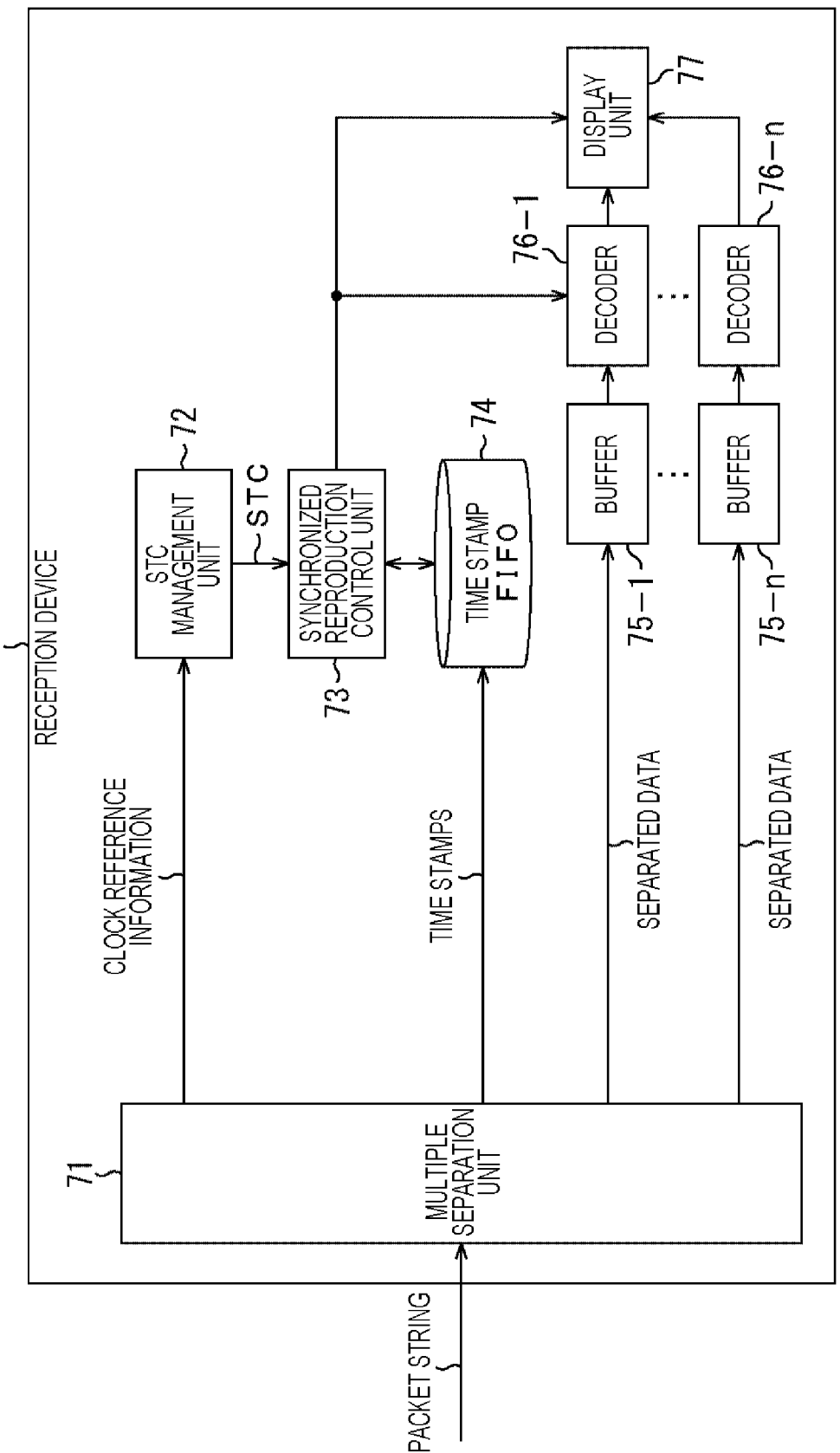
FIG. 6 is a diagram explaining an exemplary configuration of a related reception device.
Figure 8:
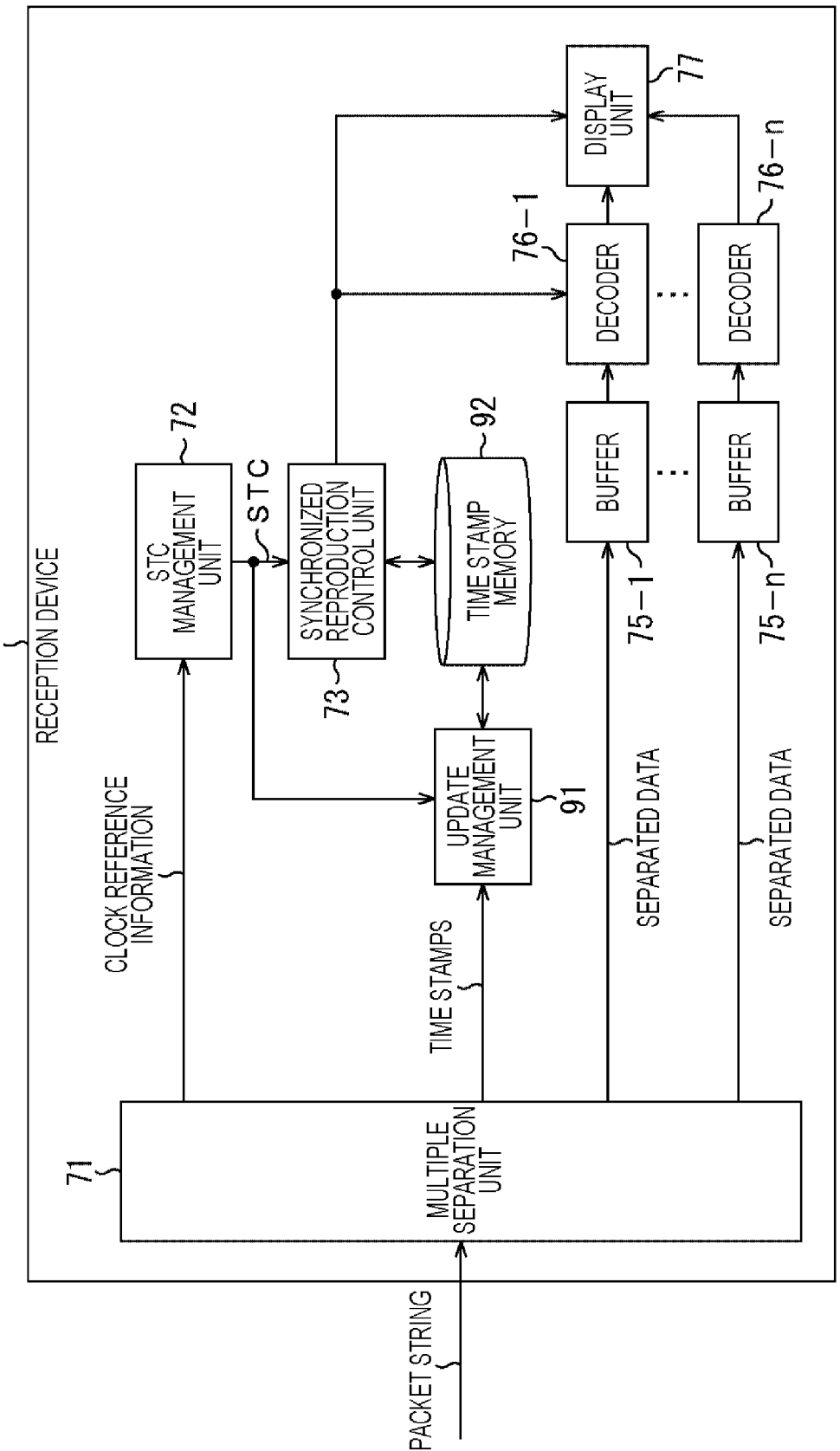
FIG. 8 is a flowchart explaining a reception method by the reception device of FIG. 8.

In other words, in the reception device 70 of FIG. 8, the difference from the reception device 70 of FIG. 6 is that a time stamp memory 92 is added as a substitute for the time stamp FIFO 74 and an update management unit 91 is further included.

In a case where the STC becomes decoding time, the update management unit 91 associates access unit data such as a picture, an audio frame, or the like of video with time stamp information. The update management unit 91 stores, in the time stamp memory, the access unit and time stamp in a condition of being extracted by the multiple separation unit 71 and associated with each other, and reassociates the time stamps with the access unit when updating and storing the time stamp information.

<Reception Process by Reception Device of FIG. 8>

Next, with reference to the flowchart of FIG. 9, a reception process by a reception device of FIG. 8 will be described.

In step S31, the multiple separation unit 71 separates, from a packet string including a multiplexed stream, clock reference information, a time stamp, and video/audio data (separated data) of each channel and outputs the data to the STC management unit 72, update management unit 91, and buffer 75 respectively.

In step S32, the STC management unit 72 generates an STC on the basis of clock reference information, and outputs the STC to the synchronized reproduction control unit 73.

In step S33, the update management unit 91 refers to the time stamp memory 92, compares with the provided time stamp, and determines whether or not the time stamp of the same group (same MPU) is already received. In other words, the provided time stamp is updated and it is determined whether or not the time stamp is a newly provided time stamp.

In step S33, in a case where the time stamp of the same group is already received and an updated time stamp is being transmitted, the process proceeds to step S34.

In step S34, regarding the time stamp of the same group, the update management unit 91 replaces an undecoded time stamp with the transmitted time stamp and stores the replaced time stamp in the time stamp memory 92.

<Example of Changing Time Stamp>

Figure 10:
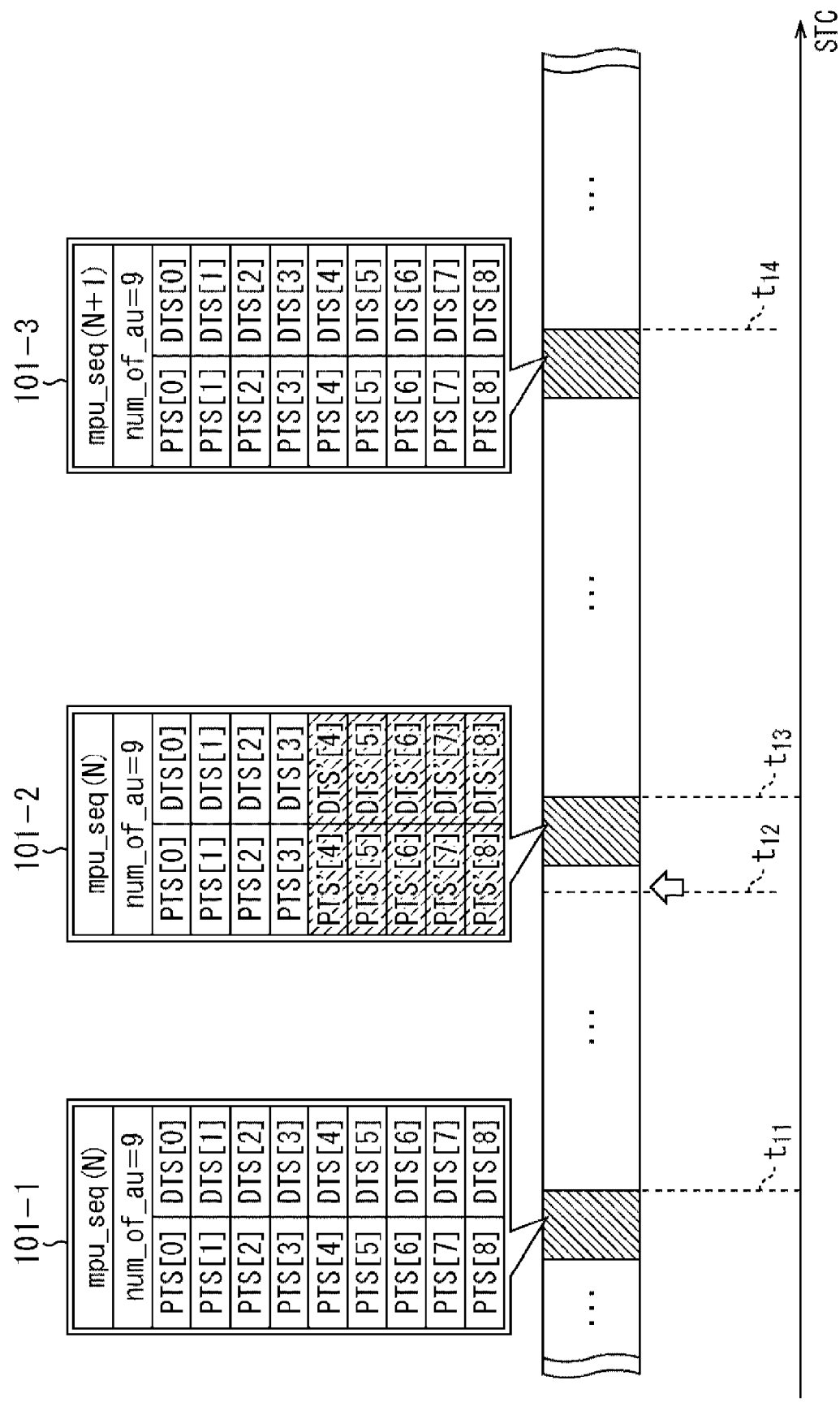
FIG. 10 is a diagram explaining a process for changing time stamps.

In other words, for example, as illustrated in FIG. 10, in a case where control information 101-1 having an MPU sequence number of N and including time stamp information for nine frames is already stored in the time stamp memory 92 at time t11 and a new time stamp is generated and transmitted at time t12, it is assumed that an updated time stamp is being transmitted.

After time t12, it is assumed that the time stamp is already recorded and, at time t13, in the control information 101-2 in the time stamp memory 92, time stamps PTS[4] to [8] and DTS[4] to [8], which are the time stamps of undecoded access units AU[4] to [8], are replaced with transmitted stamps PTS'[4] to [8] and DTS'[4] to [8]. In other words, at time t12, it is indicated that the time stamps of PTS[0] to [3] and DTS[0] to [3] are already decoded.

Here, in FIG. 10, time t13 needs to be a timing prior to the decoding time DTS[4]. Thus, in the reception device 70 of FIG. 8, the transmission device 11 needs to complete the transmission process so that the control information 141-2 is received by the decoding time DTS[4] of the access unit AU[4]. Further, at time t14, it is indicated that the control information 101-3 having a following sequence number (N+1) is stored.

Here, in FIG. 10, the control information 101-1 to 101-3 are illustrated from the left in the upper part and, among the information, the control information 101-1 and 101-2 have the same sequence number N (=mpu_seq(N)), nine access units AU (frame number) (=mpu_of_au=9), followed by time stamps PTS[0] to [8] indicating showing time in order from the above in the left side, and time stamps DTS[0] to [8] indicating decoding time in order from the above in the right side.

<Example of Changing Number of Access Units>

Figure 11:
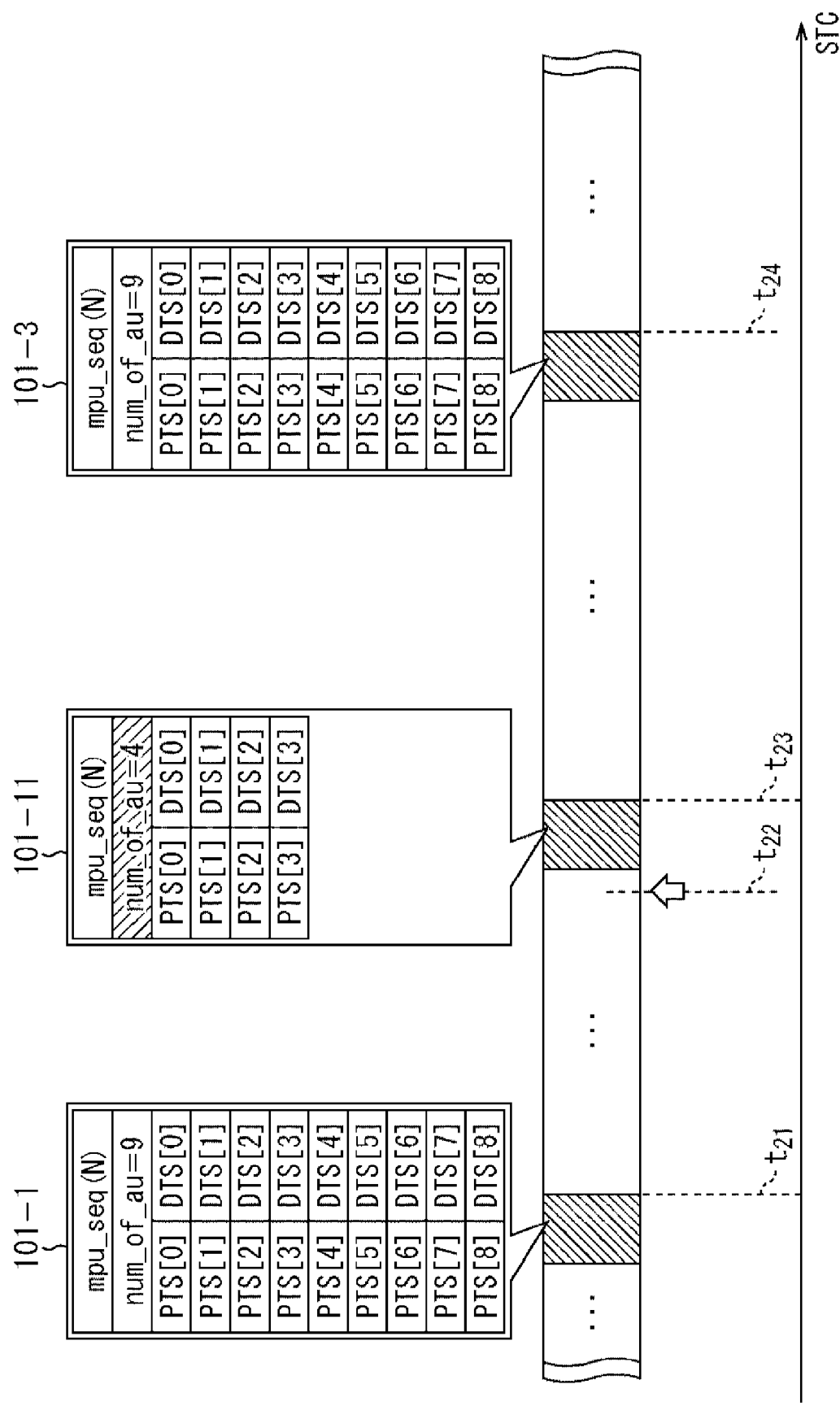
FIG. 11 is a diagram explaining a process for changing a number of access units AU.

Further, in a case where the number of access units in an MPU, which is a corresponding group, is changed from 9 to 4, the information indicating the number of access units (mpu_of_au=4) and time stamps PTS[0] to [3] of the corresponding AU[0] to [3] among the control information of time stamps indicating the number of access units may be written, and time stamps DTS[0] to [3] indicating decoding time may be recorded in the left side as illustrated in FIG. 11.

Figure 9:
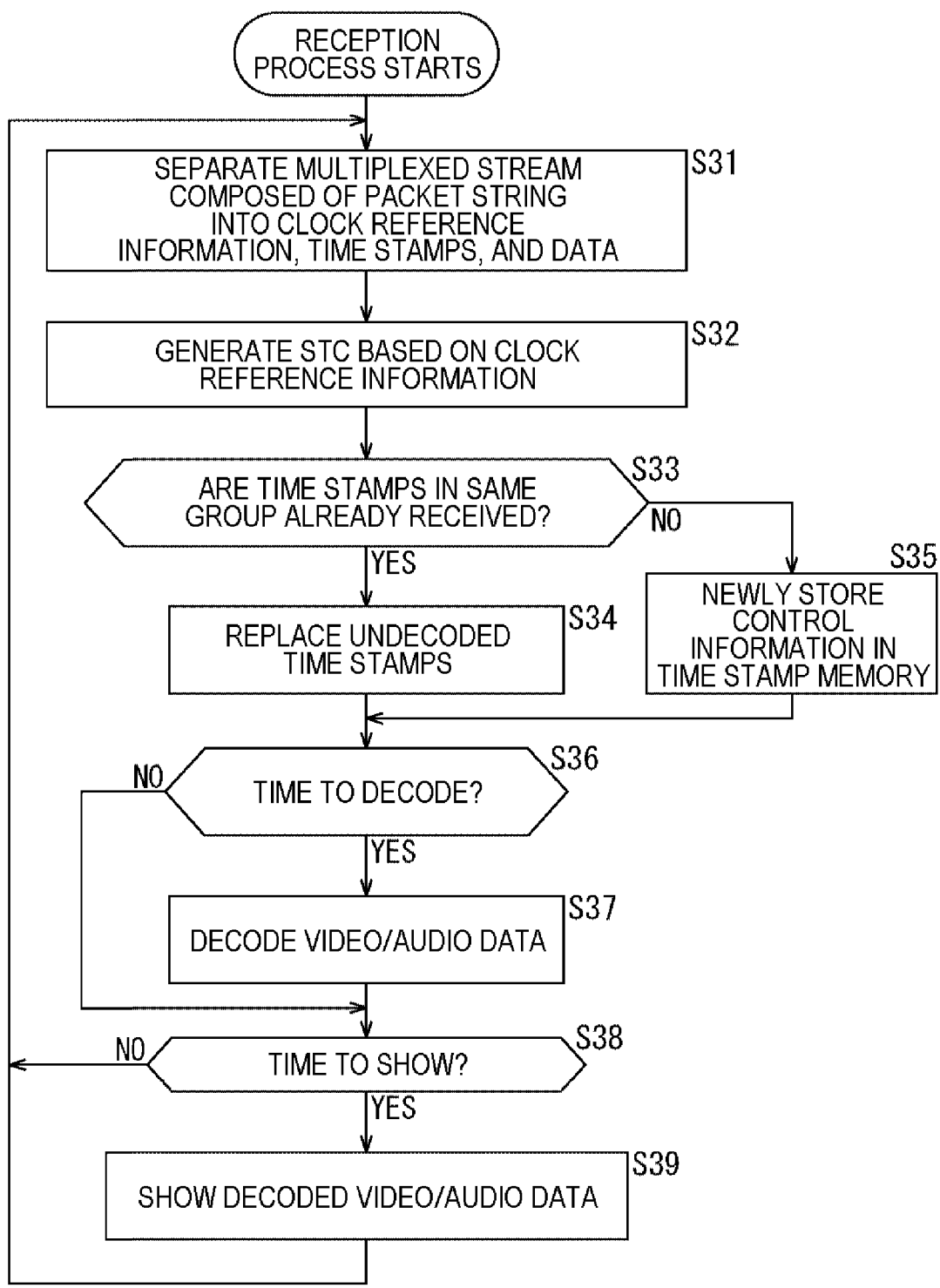
FIG. 9 is a diagram explaining a related reception device.

Here, description is given referring back to the flowchart of FIG. 9.

On the other hand, in step S33, in a case where a time stamp of the same group is firstly received and a new time stamp is being transmitted, the process proceeds to step S35.

In step S35, the update management unit 91 stores the new time stamp in the time stamp memory 92.

In step S36, the synchronized reproduction control unit 73 reads time stamp information of control information recorded in the time stamp memory 92, checks with the STC, and determines whether or not it is the time for decoding (decoding time). In step S36, for example, in a case where it is determined that it is the decoding time, the process proceeds to step S37.

In step S37, the synchronized reproduction control unit 73 controls the decoder 76 and decodes the video/audio data stored in the buffer 75.

Here, in step S36, in a case where it has not become the decoding time, the process in step S37 is skipped.

In step S38, the synchronized reproduction control unit 73 reads time stamp information in the control information recorded in the time stamp memory 92, checks with the STC, and determines whether or not it is the time for showing (showing time). In step S38, for example, in a case where it is the showing time, the process proceeds to step S39.

In step S39, the synchronized reproduction control unit 73 controls the display unit 77 to show the decoded video/audio data provided from the decoder 76, and then the process returns to step S31.

Here, in step S38, in a case where it is not the time for showing, the process in step S39 is skipped.

With the above processes, for example, the reception can be performed properly even in a case where a scene change is detected and it is desired to change the video encoding method for encoding video with a high-quality level, a case where it is desired to change a group border to insert an edit point, or the like, that is, a case where it is needed to update the video/audio data and time stamps.

It is noted that, since a timing of retransmission is set so that the control information is received prior to the changed decoding time of the access unit (for example, at a timing a predetermined period of time prior to the decoding time), the time stamp can be updated at a timing before the decoding.

Second Embodiment

Second Embodiment of Reception Device

The above description has described an example that a time stamp is updated in the time stamp memory during a retransmission process in a case where a scene change is detected and it is desired to change the video encoding method for encoding video with a high-quality level, a case where it is desired to change a group border to insert an edit point, or the like for example, that is, a case where it is needed to update the video/audio data and time stamps.

However, another method may be employed as long as the updated video/audio data and time stamps can be used and, for example, the time stamps may be continuously added and stored until the decoding is started by sequentially updating and transmitting the control information as sequentially adding only confirmed AUs in the MPU and using the latest control information in the reception device 70.

Figure 12:
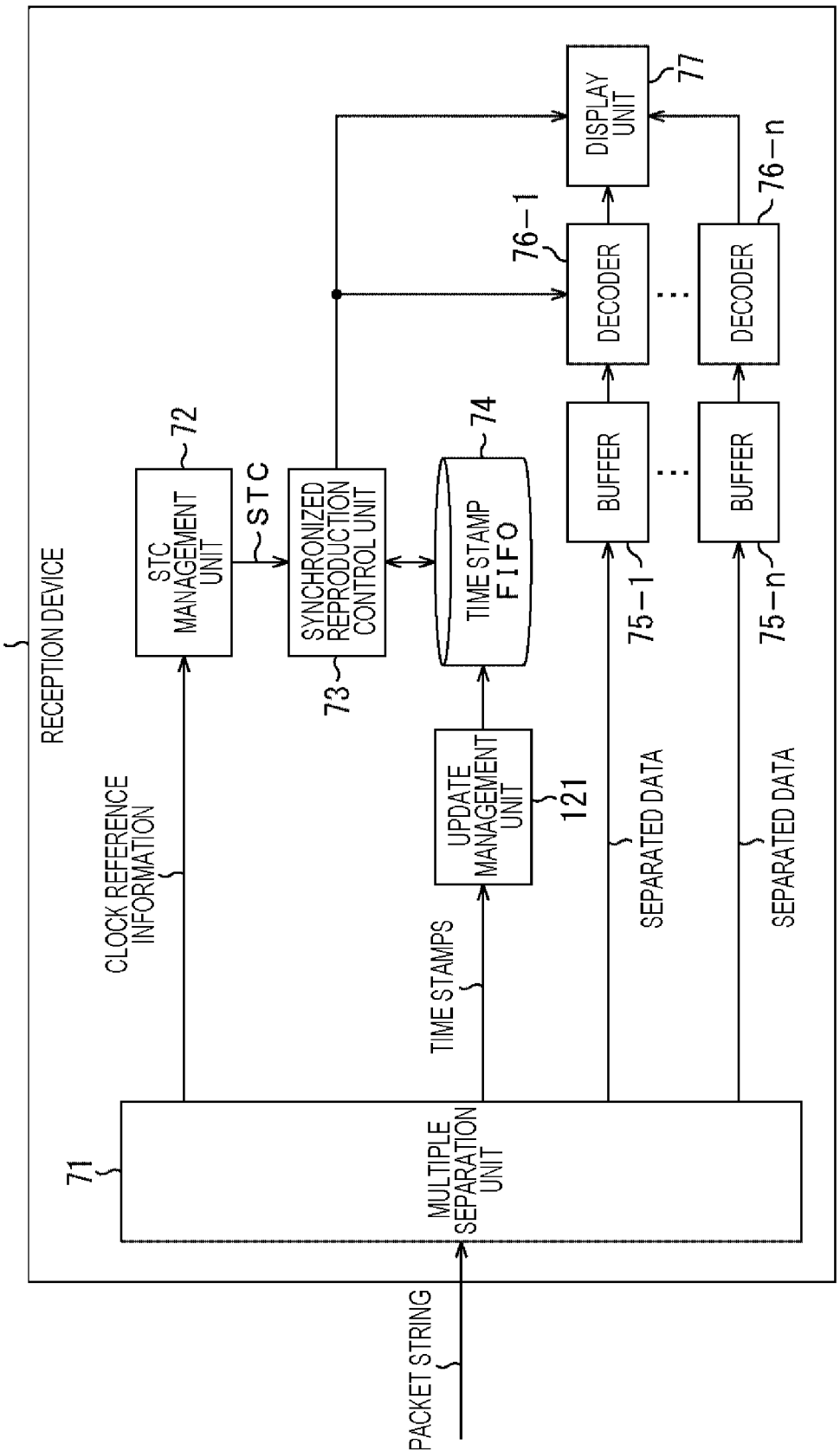
FIG. 12 is a diagram illustrating an exemplary configuration of a second embodiment of the reception device to which the present technology is applied.

FIG. 12 illustrates an exemplary configuration of a second embodiment of the reception device, which is made to sequentially add and store control information which is transmitted as being sequentially added with only confirmed AUs. Here, the configuration having a function same as that in the configuration of FIG. 6 will be given with a same name and a same reference sign, and the explanation thereof will be omitted according to need.

In other words, in the reception device 70 of FIG. 12, the difference from the reception device 70 of FIG. 6 is that an update management unit 121 is provided.

The update management unit 121 stores, in the time stamp FIFO 74, a new time stamp among sequentially provided time stamps and updates the time stamp in a case of the time stamp is a time stamp in a same MPU and the number of the AUs is greater than the previous number of the AUs.

Here, the control information packetizing unit 35 of the transmission device 11 sequentially adds only time stamps, in a group of a same MPU, which are confirmed by the synchronization control unit 34, generates a control information packet, and transmits the packet so that the packet is received before decoding of the added part is started. Further, the control information packetizing unit 35 of the transmission device 11 generates and outputs the control information packet so that the packet is received within a certain period of time after the decoding of the added part is started.

Further, the transmission device 11 does not change already transmitted time stamps even in a case where a time stamp in a group of the same MPU is changed or a configuration of the group is changed in an unconfirmed range.

Here, the configuration of the transmission device 11 is similar to that in the example of FIG. 1; however, in a case where an AU is added in a group of the same MPU, the control information packetizing unit 35 adds a time stamp related to the added AU and generates and outputs a control information packet.

<Transmission Process in Case Where Time Stamp of Confirmed AU is Added>

Figure 13:
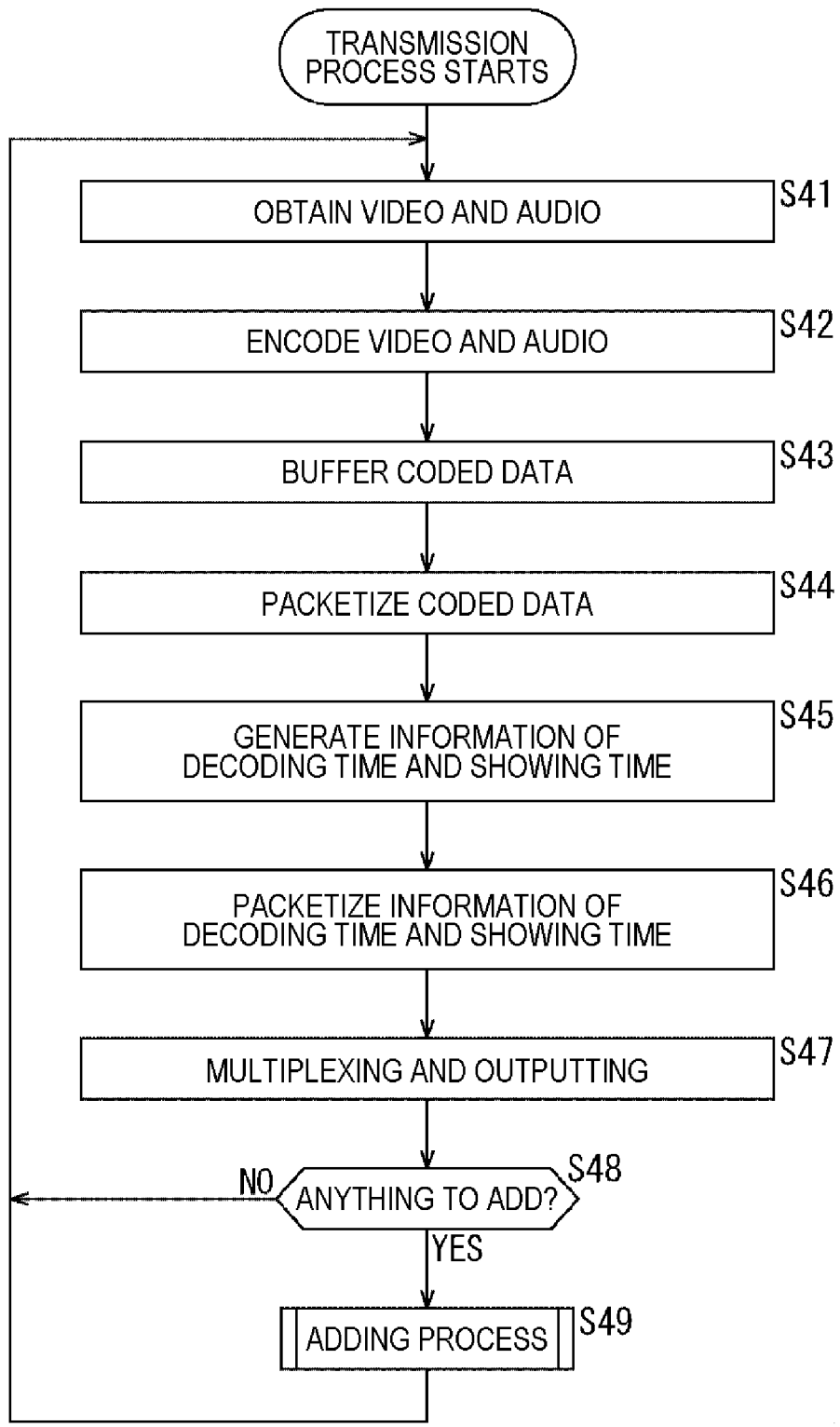
FIG. 13 is a flowchart explaining a transmission process by the transmission device of FIG. 1 in a case where time stamps of confirmed AUs are added.

Next, with reference to the flowchart of FIG. 13, a transmission process in a case where a time stamp of a confirmed AU is added will be described. Here, since the processes in steps S41 to S47 in the flowchart of FIG. 13 are similar to the processes in steps S11 to S17 in the flowchart of FIG. 5, the explanation thereof will be omitted.

Specifically, in step S48, the synchronization control unit 34 determines, regarding a processed MPU, if it is needed to add an unconfirmed time stamp and retransmit video/audio data and control information for the same MPU. In step S48, for example, regarding a same MPU, in a case where unconfirmed video/audio data and a time stamp corresponding to the video/audio data are confirmed and needed to be added, the process proceeds to step S49.

In step S49, the adding process is performed. Here, in the adding process, regarding an MPU same as the already transmitted MPU, the unconfirmed time stamp is confirmed and processes similar to the processes in steps S11 to S17 are simply performed for the control information including the added video/audio data and added time stamp, so the explanation thereof will be omitted.

Figure 14:
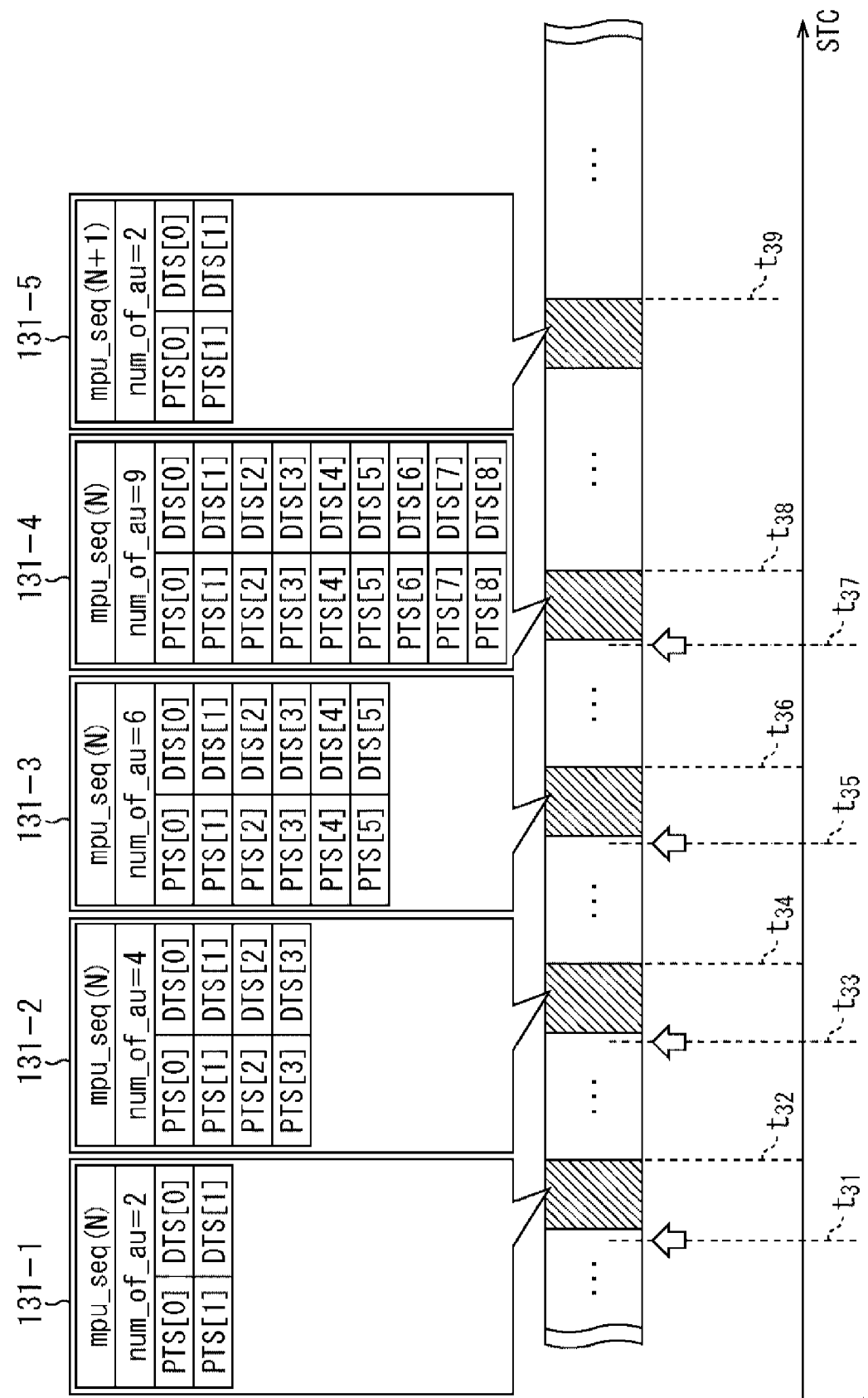
FIG. 14 is a diagram explaining a transmission process by the transmission device of FIG. 1 in a case where time stamps of confirmed AUs are added.

With the above described processes, for example, as illustrated in FIG. 14, the time stamps of access units AU[0] and AU[1] are firstly confirmed in an MPU having mpu_sequence_number of N at time t31, and control information 131-1 including time stamp information of the AUs the number of which is 2 is transmitted at time t32.

Next, the time stamps of access units AU[2] and AU[3] are confirmed at time t33, and control information 131-2 including the newly confirmed time stamps, as time stamps having the number of access units AU of 4 is transmitted at time t34.

Similarly, the time stamps of the access units AU[4] and AU[5] are confirmed at time t35, and control information 131-3 including the newly confirmed time stamps as time stamps having the number of access units AU of 6 is transmitted at time t36.

The time stamps of the access units AU[6] to AU[8] are confirmed at time t37, and control information 131-4 including the newly confirmed time stamps as time stamps having the number of access units AU of 9 is transmitted at time t38.

With the series of processes at time t31 to t38, the transmission of the control information of the MPU having mpu_sequence_number of N is completed. As a result, the control information can be transmitted repeatedly, as sequentially adding newly confirmed time stamps of AUs, until the time stamps in the same MPU or all the time stamps of the AUs, are confirmed.

Here, in a case where the timing of a transmission of the addition is a timing so that the control information is received in the reception device before the time when decoding of an access unit to be added is started (for example, a timing a predetermined period of time prior to the decoding time), the reception device can use the added time stamp at the timing before the decoding.

<Reception Process Corresponding to Transmission Process of FIG. 13>

Figure 15:
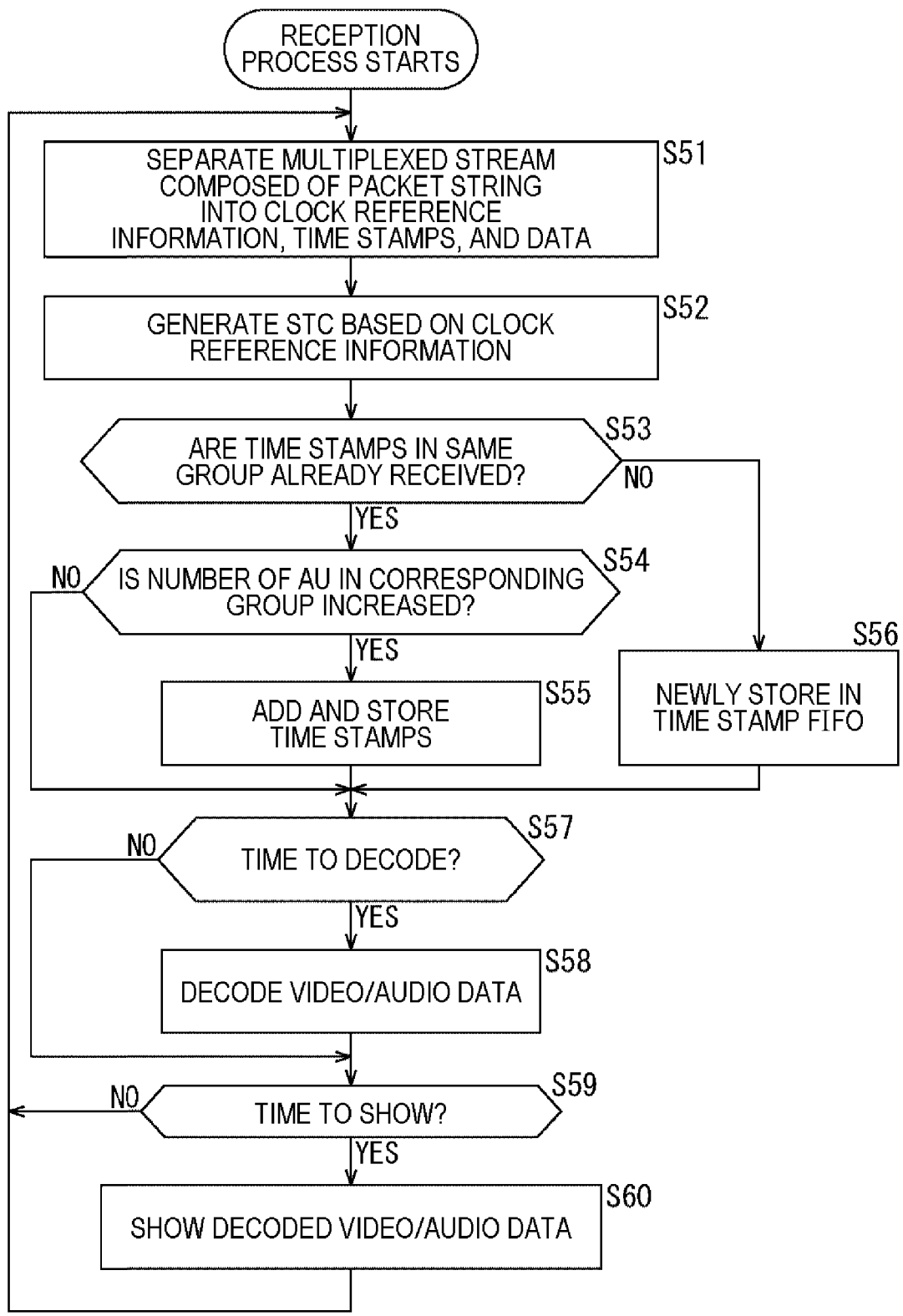
FIG. 15 is a flowchart explaining a reception process corresponding to the transmission process of FIG. 13.

Next, with reference to the flowchart of FIG. 15, a reception process by the reception device 70 of FIG. 12, corresponding to the transmission process of FIG. 13, will be described. Here, since the processes in steps S51 to S53 and steps S56 to S60 in the flowchart of FIG. 15 are similar to the processes in steps S31 to S33 and steps S35 to S39 in the flowchart of FIG. 9, the explanation thereof will be omitted.

Specifically, in a case where time stamps of the same group are already received and an updated time stamp is being transmitted in step S53, the process proceeds to step S54.

In step S54, the update management unit 121 determines whether or not the number of the AUs in the corresponding group of the same MPU is increased. In a case that the number of the AUs is increased in in step S54, it is assumed that a new time stamp is confirmed, and the process proceeds to step S55.

In step S55, the update management unit 121 adds and stores the new time stamp of an added AU to the time stamp FIFO 74, regarding the time stamps in the same group.

For example, the reception of the control information of the MPU having mpu_sequence_number of N, which is transmitted in the series of processes at time t31 to t38 illustrated in FIG. 14, is completed. As a result, the control information can be sequentially received as sequentially including added time stamps of newly confirmed AUs.

With the above processes, since a process to replace the time stamps with new time stamps in a time stamp memory or the like is not needed, the process load can be reduced and the reception can be performed properly even in a case where the video/audio data and time stamps are needed to be updated.

Third Embodiment

The above has been described an example that control information is updated as sequentially adding only confirmed AUs within the MPU, the control information is sequentially transmitted, and, in the reception device, by using the newest control information, time stamps are sequentially added and stored before decoding is started. However, another method may be used as long as time stamps of only confirmed AUs can be added and, for example, time stamps may be added and stored as indicating the number of confirmed AUs and the number of unconfirmed AUs and sequentially adding confirmed time stamps of the AUs.

Figure 16:
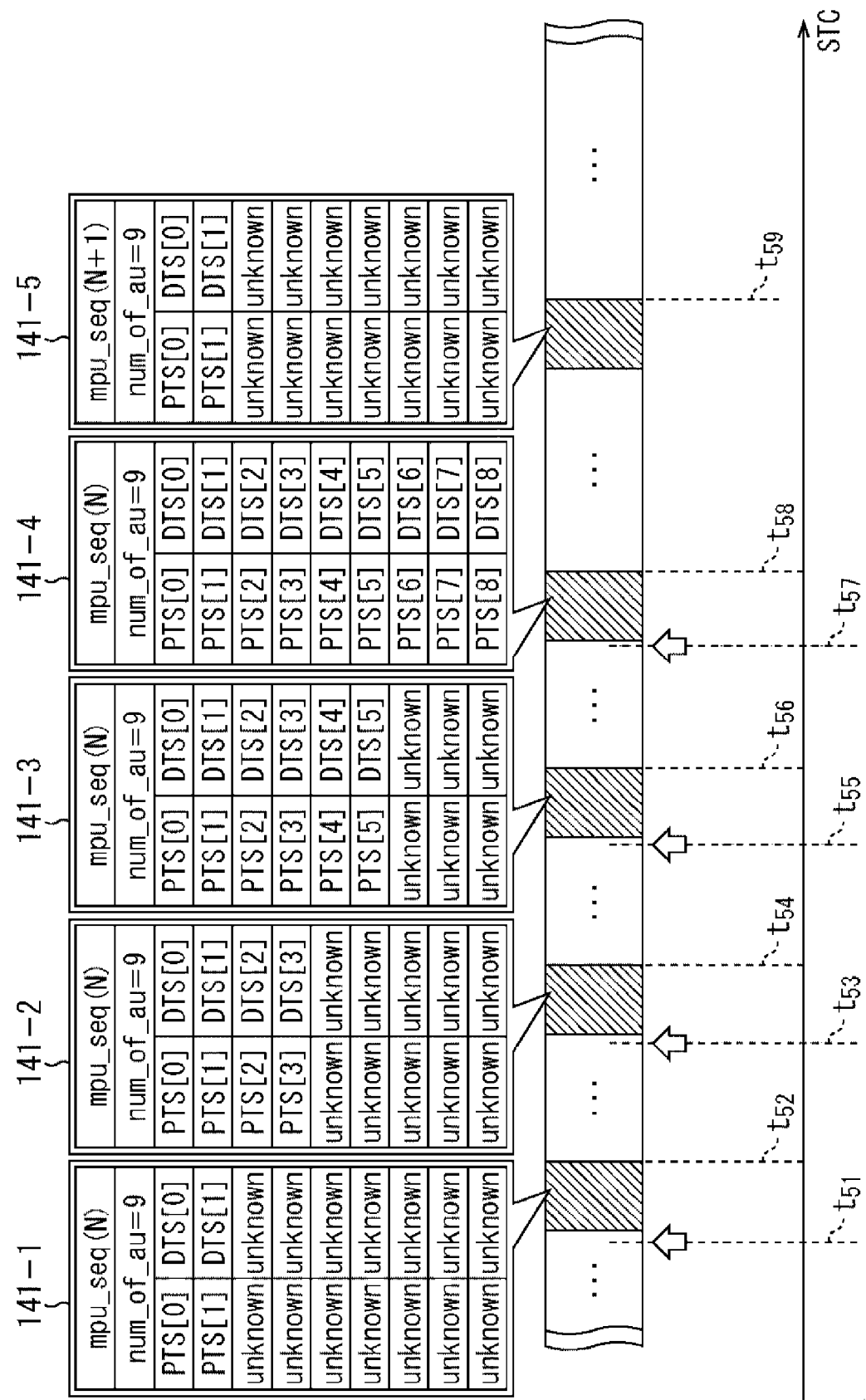
FIG. 16 is a diagram explaining a process of transmission and reception as clearly indicating a number of confirmed AUs and a number of unconfirmed AUs.

In other words, as illustrated in FIG. 16, for example, since num_of_au=9 is fixed, and only time stamps of the access units AU[0] and AU[1] are firstly fixed in the MPU having mpu_sequence_number of N at time t51, control information 141-1 including time stamps of the access units AU[0] and AU[1] and uncertain values (unknown) for other areas are transmitted at time t52.

Next, since the time stamps of the access units AU[2] and AU[3] are confirmed at time t53, control information 141-2 including time stamps of the access units AU[0] to AU[3] and uncertain values (unknown) for other areas are transmitted at time t54.

Similarly, since time stamps of the access units AU[4] and AU[5] are confirmed at time t55, control information 141-3 including time stamps of the access units AU[0] to AU[5] and uncertain values (unknown) for other areas are transmitted at time t56.

Further, since time stamps of access units AU[6] to AU[8] are confirmed at time t57, control information 141-4 including time stamp information of the access units AU[0] to AU[8] is transmitted at time t58.

With the series of processes at time t51 to t58, the transmission of the control information of the MPU having mpu_sequence_number of N is completed. As a result, the control information can be sequentially transmitted as sequentially adding newly confirmed time stamps of the AUs.

Exemplary Configuration of Transmission Device According to Third Embodiment

Next, with reference to FIG. 17, an exemplary configuration of a transmission device that is made to transmit control information as indicating the number of confirmed AUs and the number of unconfirmed AUs and sequentially adding time stamps of confirmed AUs will be described. Here, in the transmission device 11 of FIG. 17, the configuration having a function same as the configuration of the transmission device 11 of FIG. 1 will be applied with the same name and the same reference sign and the explanation will be omitted according to need.

Figure 17:
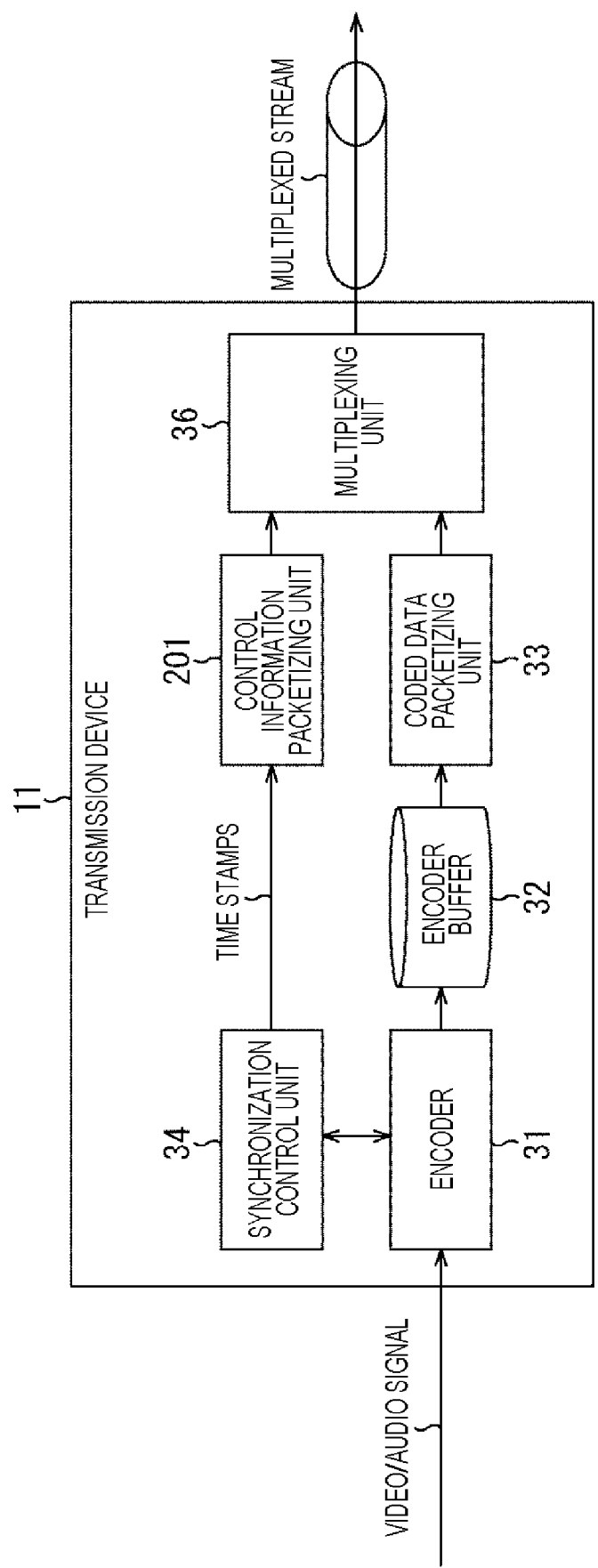
FIG. 17 is a diagram explaining the process of transmission and reception as clearly indicating the number of confirmed AUs and the number of unconfirmed AUs.

In other words, the difference between the transmission device 11 of FIG. 17 and the transmission device 11 of FIG. 1 is that a control information packetizing unit 201 is provided as a substitute for the control information packetizing unit 35. The control information packetizing unit 201 has a basic function which is similar to the function of the control information packetizing unit 35, and further, adds and generates control information as indicating the number of confirmed AUs and the number of unconfirmed AUs, and sequentially adding a time stamp of confirmed access unit AU. As a result, the reception device can recognize the number of unconfirmed AUs in advance.

Exemplary Configuration of Reception Device According to Third Embodiment

Figure 18:
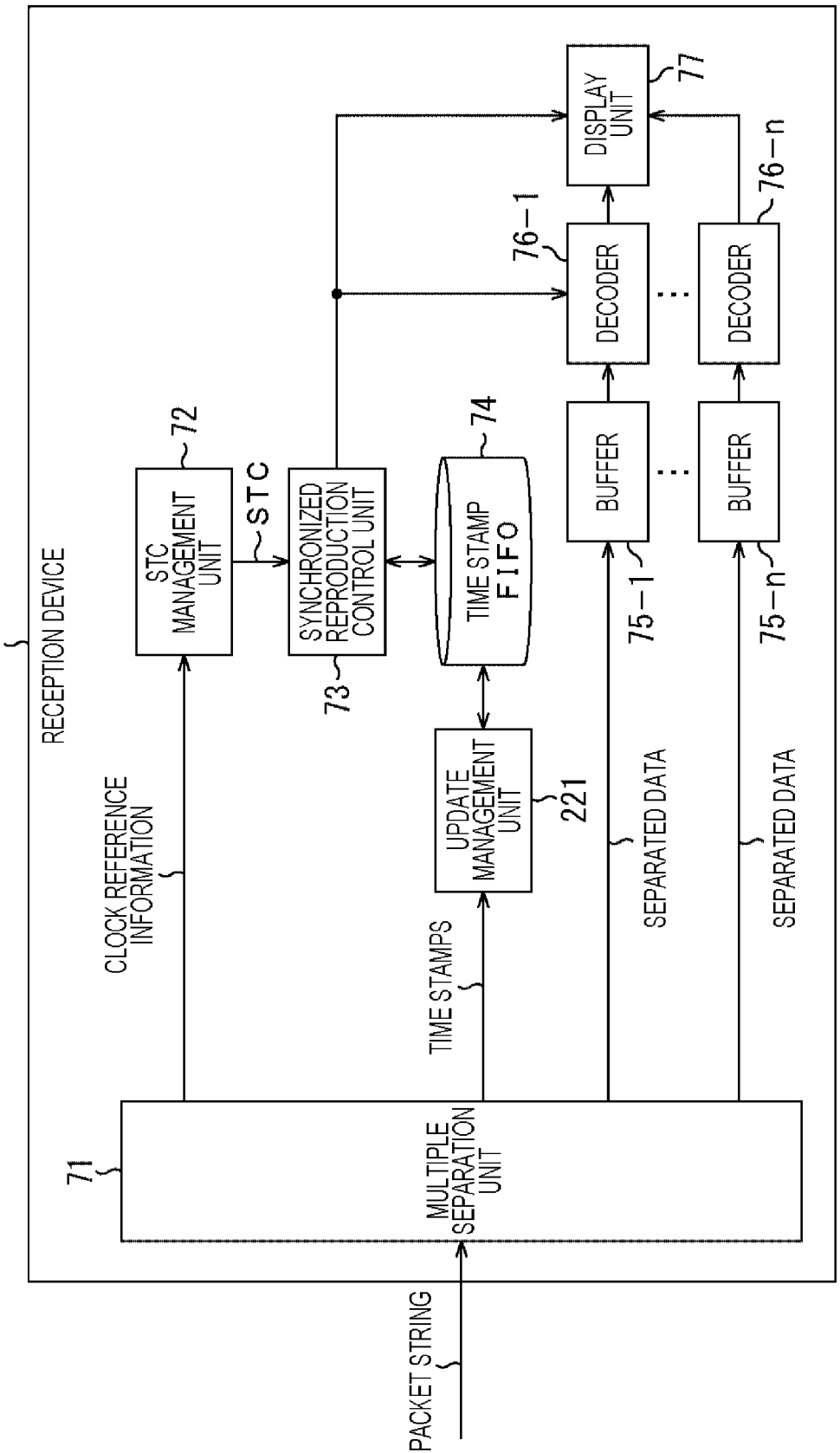
FIG. 18 is a diagram illustrating an exemplary configuration of a third embodiment of the transmission device to which the present technology is applied.

Next, with reference to FIG. 18, an exemplary configuration of a reception device that is made to receive control information generated as sequentially adding the time stamps of confirmed AUs, and indicating the number of confirmed AUs and the number of unconfirmed AUs. Here, in the reception device 70 of FIG. 18, the configuration having a function same as that of the reception device 70 of FIG. 6 will be applied with the same name and the same reference sign, and the explanation thereof will be omitted according to need.

Specifically, the difference between the reception device 70 of FIG. 18 and the reception device 70 of FIG. 6 is that an update management unit 221 is added.

The update management unit 221 stores control information including a time stamp to the time stamp FIFO 74. In this case, the update management unit 221 stores a new time stamp to the time stamp FIFO 74 and stores that unconfirmed information is included in a case that unconfirmed information is included in the time stamps in the new control information. Then, in a case where a next time stamp is transmitted and the time stamp included in the previous control information includes unconfirmed information, the update management unit 221 adds control information in which a confirmed time stamp in the AUs and sequentially stores the control information, and, in a case where there is an unconfirmed time stamp, that information is stored. Then, after time stamps of all the AUs are confirmed, the update management unit 221 stores the new control information again and repeats a similar process.

<Transmission Process by Transmission Device of FIG. 17>

Figure 19:
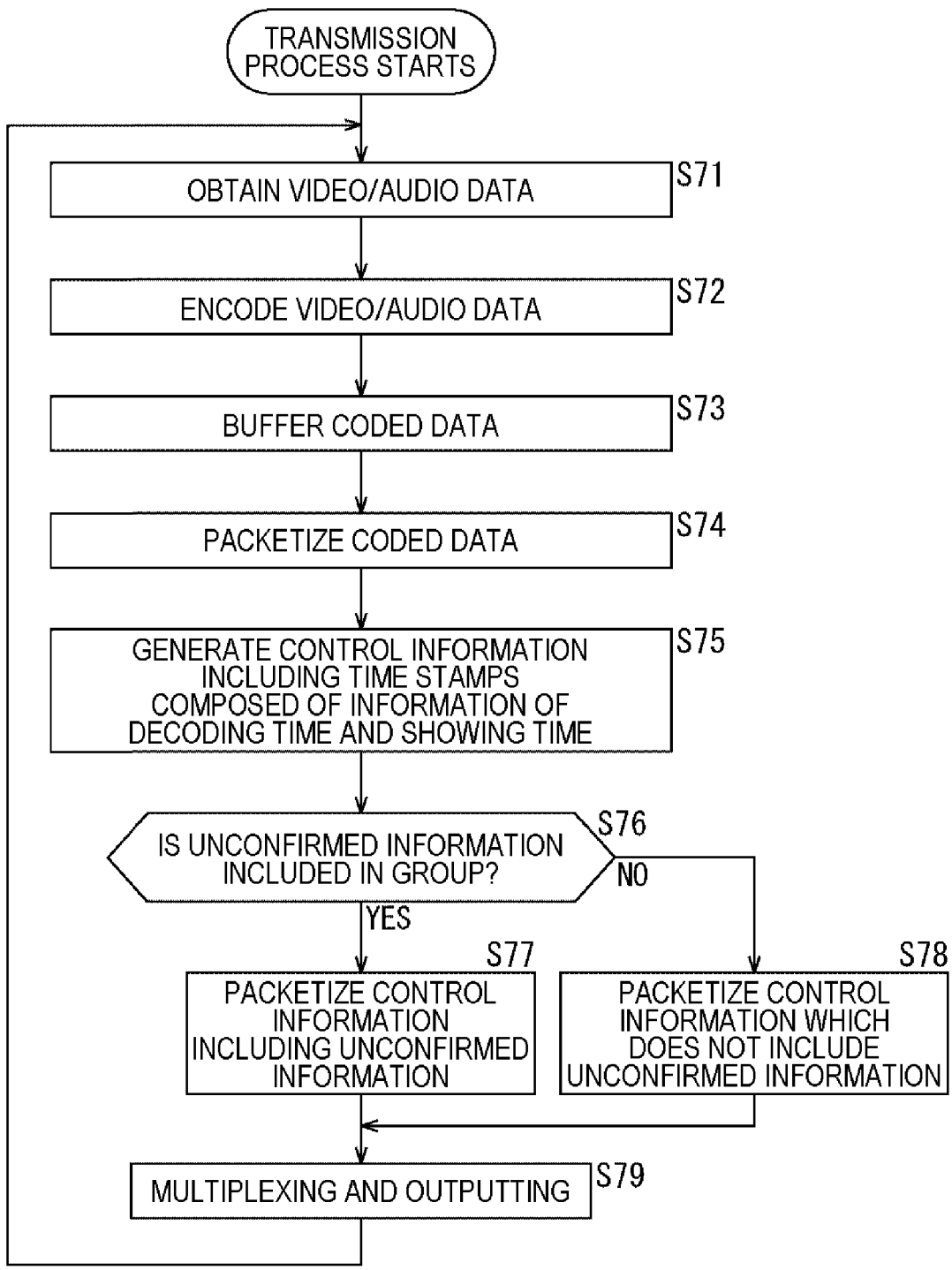
FIG. 19 is a flowchart explaining a transmission process by the transmission device of FIG. 17.

Next, with reference to the flowchart of FIG. 19, a transmission process by the transmission device 11 of FIG. 17 will be described. Here, since the processes insteps S71 to S75 and S79 of FIG. 19 are similar to the processes in steps S11 to S15 and S17 of FIG. 5, the description thereof will be omitted according to need.

Specifically, in step S76, the control information packetizing unit 201 determines whether or not there is the information of a time stamp of an unconfirmed AU in the group. In step S76, for example, as illustrated by time t51 of FIG. 16, in a case where only time stamps of access units AU[0] and AU[1] are confirmed and the time stamps of access units AU[2] to AU[8] are unconfirmed, it is assumed that there is unconfirmed information and the process proceeds to step S77.

In step S77, the control information packetizing unit 201 generates and packetizes control information including a time stamp including decoding time/showing time including unconfirmed information. In other words, in this case, for example, the control information 141-1 illustrated in FIG. 16 is generated.

On the other hand, as illustrated as time t57 of FIG. 16, in step S76, for example, in a case where all the time stamps of the access units AU[0] to AU[8] are confirmed and there are no unconfirmed time stamps, it is assumed that there is no unconfirmed information, and the process proceeds to step S78.

In step S78, the control information packetizing unit 201 generates and packetizes control information including a time stamp including decoding time/showing time which does not include unconfirmed information. In other words, in this case, for example, the control information 141-4 illustrated in FIG. 16 is generated.

With the above described processes, control information generated as sequentially adding a time stamp of a confirmed AU can be transmitted as indicating the number of confirmed AUs and the number of unconfirmed AUs. As a result, since only the confirmed time stamp is added and transmitted, the reception device does not have to perform a process to update the received time stamps.

In this case, for example, the control information packetizing unit 201 can perform a process by using the MPU extended time stamp descriptor 54 of FIG. 3 and writing a command to realize the above described processes in steps S77 and S78.

More specifically, for example, the MPU extended time stamp descriptor 54 is a syntax defined by ARIB-STD-B60 and written as illustrated in FIG. 20 for example.

<Syntax of Common MPU Extended Time Stamp Descriptor>

FIG. 20 illustrates an example of a syntax description of the MPU extended time stamp descriptor 54 and illustrates description (Syntax), the number of bits (No. of Bits), and a format (Format) in order from the left.

The first line says "MPU_Extended_Timestamp_Descriptor" and states that the data is the MPU extended time stamp descriptor 54.

The second line says "descriptor_tag" and describes a tag to identify a 16-bit descriptor.

The third line says "descriptor_length" and is an 8-bit descriptor of information indicating a length.

The fourth line says "reserved" and is a 5-bit descriptor as a reserved part.

The fifth line says "pts_offset_type" and is a 2-bit descriptor of an offset type.

The sixth line says "timescale_flag" and is a 1-bit descriptor of a timescale flag.

The seventh to ninth lines say "if (timescale_flag==1)" and "{timescale}" and define "{timescale}," which is set in 32 bits, in a case where the flag in the sixth line is 1.

The 10th to 12th lines say "if (pts_offset_type==1)" and "{default_pts_offset}" and define "{default_pts_offset}," which is set in 16 bits, in a case where the type in the fifth line is 1.

The 13th to 23rd lines are areas to describe time stamp information of each MPU.

The 13th line says "for (i=0; i<N; i++)" and defines that the processes to the 23rd line are in a loop from 0 to N of a counter i.

The 14th line says "mpu_sequence_number" and describes, in 32 bits, a sequence number of a time stamp of control information of each MPU.

The 15th line says "mpu_decoding_time_offset" and defines, in 16 bits, an absolute value of a difference between decoding time of the first AU in a decoding order and showing time of the first AU in a showing order in the MPU.

The 16th line says "num_of_au" and defines, in 8 bits, a number of access units AU including "dts_ptsf_offset" and "pts_offset."

The 17th line says "for(j=0;j<num_of_au;j++)" and defines that the processes in the 17th to 20th lines are in a loop from 0 to num_of_au of a counter j.

The 18th line says "dts_ptsf_offset" and defines, in 16 bits, a difference between decoding time and showing time of each AU.

The 19th line says "if (pts_pts_offset==2)" and defines that the difference from a showing time of the previous AU in the showing order is to be defined in a 16-bit value, according to the description of "pts_offset" in the 20th line, in a case where the type defined in the fifth line is 2.

In other words, it is described that time stamp corresponding to each AU is set in the loop process from the 17th to 21st lines.

Further, it is indicated that a process to set a time stamp for a same unit of MPU is repeated by the loop process from the 13th to 23rd lines.

With the descriptions defined in this manner, in the transmission process illustrated in FIG. 5, for example, time stamps in the control information 101 are set as illustrated in FIG. 10 or 11.

<Syntax Example of MPU Extended Time Stamp Descriptor that Realizes Transmission Process of FIG. 19>

Next, there described will be an example of a syntax which includes a change (addition) of a part of description of the common MPU extended time stamp descriptor illustrated in FIG. 20 and realizes the transmission process of FIG. 19. Here, regarding the following syntax, the loop part for expressing time stamp information for each mpu_sequence_number corresponding to the descriptions in the 13th to 23rd lines in FIG. 20 will be explained.

In other words, as illustrated in FIG. 21, valid_flag that indicates whether or not time stamp information is valid for each AU is introduced and, time stamp information such as dts_ptsf_offset and pts_offset is included only in a case where valid_flag indicates that the time stamp information is valid. Here, in FIG. 21, the lines added to the common description are colored.

Specifically, the seventh line in FIG. 21 says "valid_flag" and sets a 1-bit flag that indicates whether or not the corresponding AU is a confirmed time stamp.

The eighth line in FIG. 21 says "if (valid_flag==1)" and indicates that a time stamp is written in a case where the "valid_flag" is set as 1 to indicate that the corresponding AU is a confirmed time stamp.

<Reception Process by Reception Device of FIG. 18>

Figure 22:
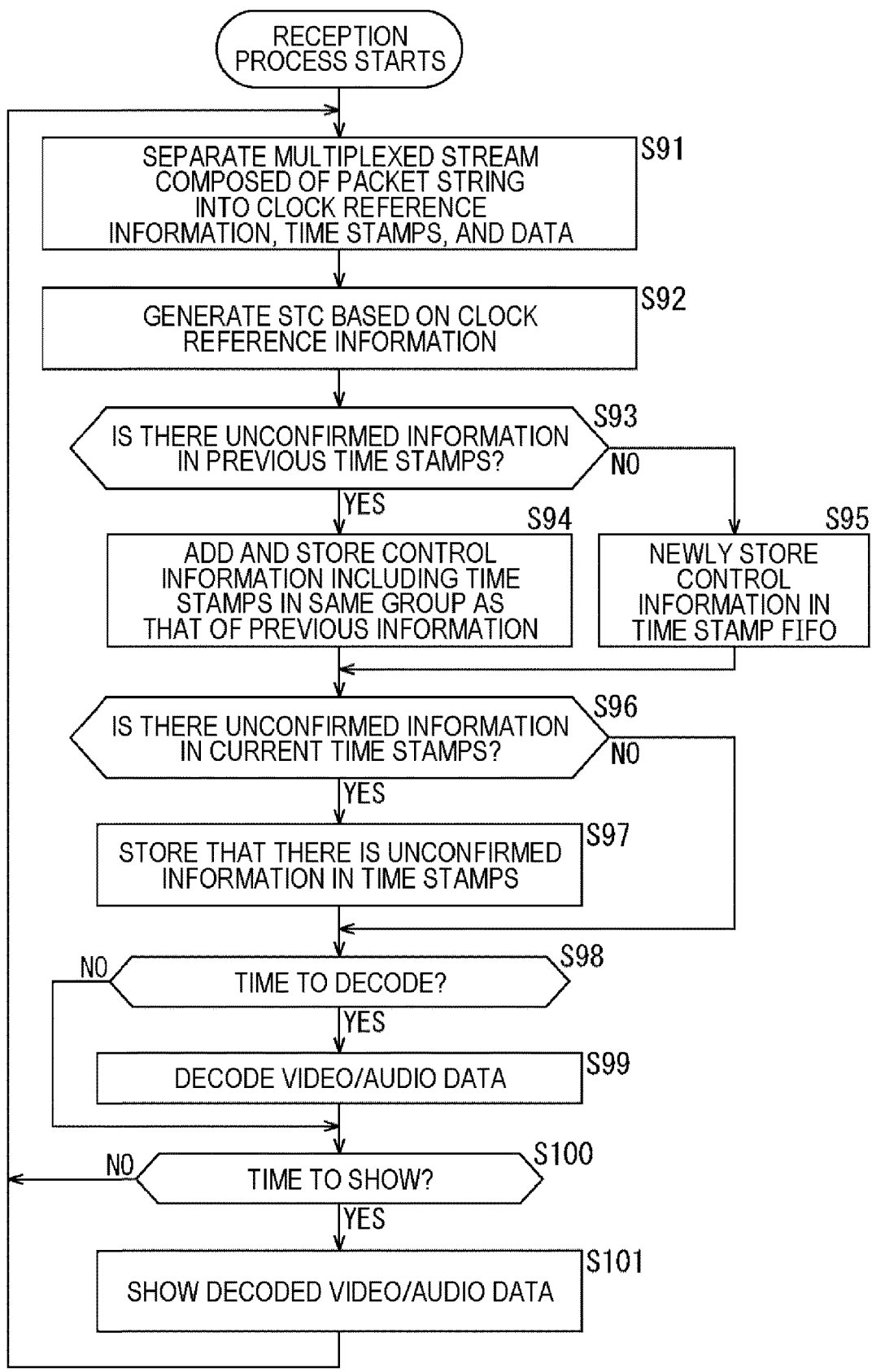
FIG. 22 is a flowchart explaining a reception process by the reception device of FIG. 18.

Next, with reference to the flowchart of FIG. 22, a reception process by the reception device of FIG. 18 will be described. Here, since processes in steps S91, S92, and S98 to S101 in the reception process of FIG. 22 are similar to the processes in steps S31, S32, and S36 to S39 in the reception process of FIG. 9, the explanation thereof will be omitted.

In other words, in step S93, the update management unit 221 determines whether or not there is unconfirmed information in time stamps included in previous control information. In step S93, in a case where there is no unconfirmed information, the process proceeds to step S95.

In step S93, in a case where there is no unconfirmed information in the time stamps of the previous control information, the previous time stamps are complete time stamps in which the time stamps of all AUs are confirmed and, since the transmitted data is assumed to be a new time stamp in the following steps, the update management unit 221 stores the time stamp included in the transmitted control information to the time stamp FIFO 74 as a time stamp of a group of a new MPU, and the process proceeds to step S96.

In step S96, the update management unit 221 determines whether or not there is unconfirmed information in a current time stamps and, in a case where there is unconfirmed information, it is stored, in step S97, that there is unconfirmed information in a previous time stamp for a following process.

Here, in a case where there is no unconfirmed information in step S96, the process in step S97 is skipped.

On the other hand, in a case where there is unconfirmed information in the previous time stamp in step S93, the process proceeds to step S94.

In step S94, the update management unit 221 adds a time stamp of a group same as the MPU of the time stamp of the previous control information and stores the control information to the time stamp FIFO 74, and the process proceeds to step S96.

In other words, the presence or absence of unconfirmed information is stored every time when control information including a time stamp is transmitted and, in a case where unconfirmed information is stored in previous time stamps, it is made to assume that a time stamp, which is in the same group as the previous MPU and includes confirmed information added therein among the unconfirmed information, is being transmitted, and the control information is added and stored to the time stamp FIFO 74.

As a result, the reception device can easily manage the time stamps only by adding and storing transmitted time stamps.

<First Modification>

The above has been described an example, as illustrated in FIG. 21, in which the description which is partially changed from the MPU extended time stamp descriptor 54 defined in ARIB-STD-B60 is used and the number of confirmed AUs and the number of unconfirmed AUs are specified so that control information, which is generated as sequentially adding confirmed time stamps of the AUs, is transmitted and received; however, the description of the MPU extended time stamp descriptor 54 may be other descriptions as long as a similar function can be maintained.

For example, as indicated in the seventh line of FIG. 23, valid_flag that indicates whether or not the time stamp information is valid may be used for each AU, similarly to FIG. 21 and, only in a case where valid_flag indicates that the information is valid, the time stamp information such as dts_ptsf_offset and pts_offset may be indicated as valid values.

<Second Modification>

Further, as indicated in the fourth line of FIG. 24, num_of_au_in_mpu indicating the number of the AUs composing the MPU may be used and, in a case where there is a difference between num_of_au_in_mpu and num_of_au, the time stamp information of the AUs corresponding to the difference may be indicated as unconfirmed information.

<Third Modification>

Further, as indicated in the fifth line of FIG. 25, as assuming that num_of_au indicates the number of AUs composing the MPU, num_of_valid_au that indicates the number of AUs having confirmed time stamp information may be used and, in a case where there is a difference between num_of_au and num_of_valid_au, the time stamp information of the AUs corresponding to the difference may be indicated as unconfirmed information.

The pieces of the time stamp information such as dts_pts-f_offset and pts_offset relevant to the number indicated by num_of_valid_au may be provided or, while the pieces of the time stamp information relevant to the number of num_of_au are provided, the value relevant to the difference between num_of_au and num_of_valid_au may be made invalid.

With either of the cases, by transmitting the control information as adding only confirmed timestamps, the reception device does not need a process for updating the time stamps which are already received.

<Fourth Modification>

Further, in a case where the time stamps are updated by using the present technology, presence or absence of an update of the time stamps can be easily recognized, and this allows the reception device to perform the process only in a case where there is an update.

For example, as indicated in the fourth line of FIG. 26, update_flag that indicates presence or absence of an update of the time stamp may be used and the reception device may perform an update process only in a case where update_flag indicates that there is an update.

<Fifth Modification>

Further, as indicated in the fourth line of FIG. 27, since complete_flag, which indicates that time stamp information for the current MPU is confirmed and there are no more updates, is used, the reception device can determine that it is not needed to perform further update processes for the MPU, which is indicated by complete_flag that there are no more updates.

Here, the present technology is not limited to the above described syntax and, for example, a counter or the like for counting in a case where there is an update may notify whether there is a time stamp update.

With the above described processes, in a case where a change is made in a group configuration or time stamps in the group, since the time stamps corresponding to the same group are collectively retransmitted to be received before the reception side starts to decode the changed part and the reception side updates the changed part, the group configuration or the time stamps can be dynamically changed.

As a result, in a transmission device that encodes an input source on a real-time basis, for example, the video encoding method can be dynamically changed to encode video with a high-quality level when a scene change is detected.

Further, for example, in a case where it is desired to change a group border to insert an edit point, since the decoding time and showing time can be changed even in a case where the decoding time and showing time are already transmitted, an edit point can be inserted.

Further, since the transmission device adds and transmits only confirmed time stamps in the group and the reception device adds the time stamps, a group configuration or time stamps can be dynamically changed.

In this case, since it is not needed to update the time stamps which have been received once, a process for updating the received time stamps in the reception device can be omitted.

Further, since it is notified whether or not there is an update, the reception device can easily recognize if there is a time stamp update and performs the process only in a case where there is an update, and this can simplify the process.

<Example of Processes Run by Software>

Here, the above described series of processes may be executed by hardware or may be executed by software. In a case where the series of processes are executed by software, a program composing the software is installed, from a recording medium, to a computer mounted in a dedicated hardware, a general personal computer that can execute various functions with installed various programs, or the like for example.

Figure 28:
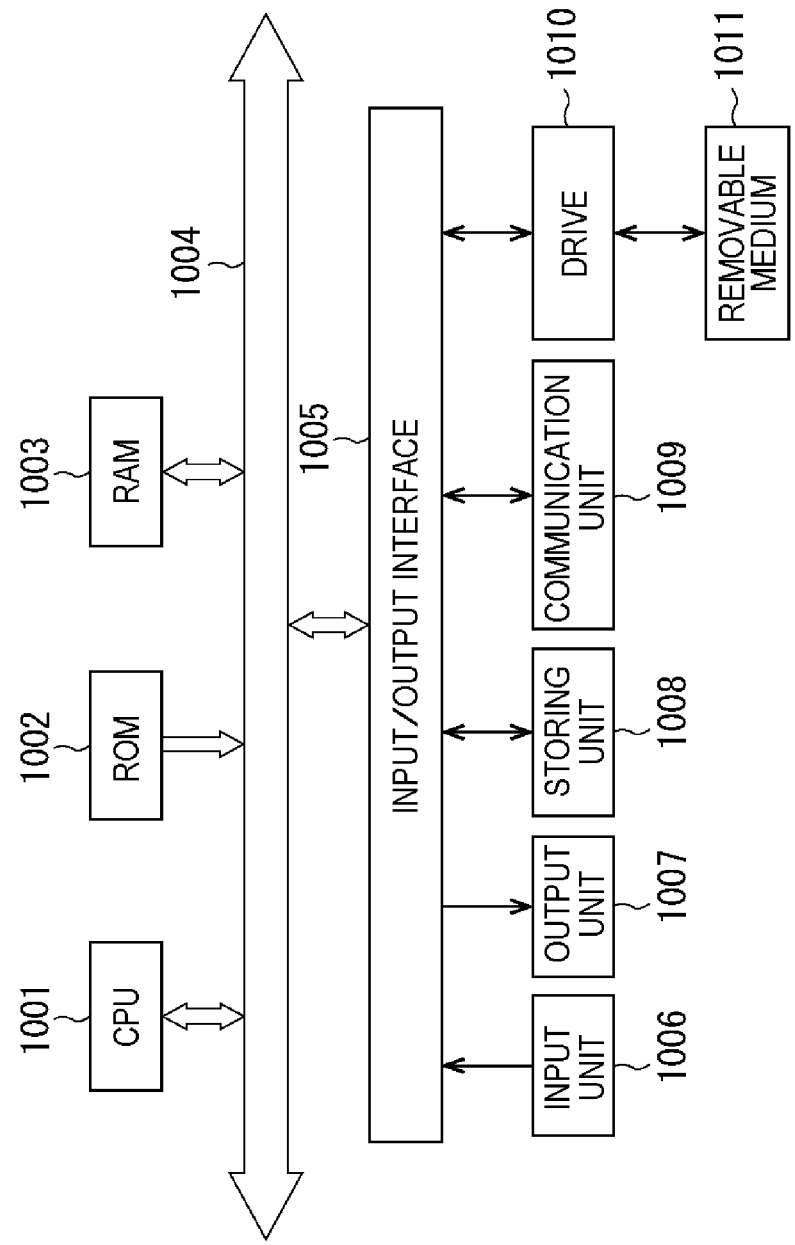
FIG. 28 is a diagram explaining an exemplary configuration of a general personal computer.

FIG. 28 illustrates an exemplary configuration of a general personal computer. The personal computer includes a central processing unit (CPU) 1001. To the CPU 1001, an input/output interface 1005 is connected via a bus 1004. To the bus 1004, a read only memory (ROM) 1002 and a random-access memory (RAM) 1003 are connected.

To the input/output interface 1005, an input unit 1006 including an input device such as a keyboard, a mouse, or the like used by a user to input an operation command, an output unit 1007 that outputs a process operation screen and a processed image to a display device, a storing unit 1008 including a hard disk drive that stores a program and various types of data, a communication unit 1009 that includes a local area network (LAN) adaptor or the like, and executes a communication process via a network such as the Internet are connected. Further, a drive 1010, which writes and reads data to and from a removable medium 1011 such as a magnetic disk (including a flexible disk), an optical disk (including a compact disc-read only memory (CD-ROM) and a digital versatile disc (DVD)), a magnetic optical disk (including a mini disc (MD)), a semiconductor memory, or the like, is also connected.

A program stored in the ROM 1002 or a program read from the removable medium 1011 such as a magnetic disk, an optical disk, a magnetic optical disk, a semiconductor memory, or the like is installed to the storing unit 1008, and the CPU 1001 executes various processes according to the program loaded to the RAM 1003 from the storing unit 1008. The RAM 1003 also stores data and the like, which is used by the CPU 1001 to execute various processes, according to need.

In the computer composed having a configuration as described above, the above described series of processes are executed by that the CPU 1001 loads the program stored in the storing unit 1008 to the RAM 1003 via the input/output interface 1005 and bus 1004 for example and executes the program.

The program executed by the computer (CPU 1001) can be recorded to the removable medium 1011 as a portable medium or the like, for example, and provided. Further, the program can be provided via a wired or wireless transmission medium such as a local area network, the Internet, or digital satellite broadcasting.

In the computer, by attaching the removable medium 1011 to the drive 1010, the program can be installed to the storing unit 1008 via the input/output interface 1005. Further, the program is received by the communication unit 1009 via the wired or wireless transmission medium and installed to the storing unit 1008. Other programs may be installed to the ROM 1002 or the storing unit 1008 in advance.

Here, the program executed by the computer may be a program that executes processes in chronological order according to the order explained in this specification or may be a program that executes the processes in parallel or at a necessary timing such as a timing when a request is made.

Further, according to the present specification, the system represents a collection of a plurality of components (such as a device, a module (part), and the like), and all the components do not have to be provided in a same housing. Thus, a plurality of devices, which are provided in different housings and connected via a network, and a device that includes a plurality of modules in a single housing are both considered as a system.

Here, the embodiments according to the present technology are not limited to the above described embodiments and various modifications can be made within a scope of the present technology.

For example, the present technology may have a configuration of cloud computing in which a plurality of devices share one function via a network and work together to perform a process.

Further, the respective steps described in the above flowcharts may be executed by a single device or may be shared and executed by a plurality of devices.

Further, in a case where a plurality of processes are included in one step, the plurality of processes included in the step may be executed by a single device or may be shared and executed by a plurality of devices.

Here, the present technology may have the following configurations.

<1> A transmission device including:
a time stamp packetizing unit configured to packetize time stamps into a time stamp packet;
an encoding unit configured to encode data associated with the time stamps;
a data packetizing unit configured to packetize the coded data encoded by the encoding unit into a data packet; and
a multiplexing unit configured to multiplex the time stamp packet and the data packet, generate a multiplexed stream, and transmit the multiplexed stream to a reception device, in which
the time stamp packetizing unit
packetizes the plurality of time stamps into the time stamp packet on a group basis, the group including the data associated with the plurality of time stamps, and
in a case where a change is made in a group configuration or the time stamps of the group, packetizes the changed group configuration or time stamps of the group into the time stamp packet, and
the multiplexing unit retransmits the time stamp packet of the changed group configuration or time stamps of the group to the reception device at a timing so that the time stamp packet is received before the reception device starts to decode the coded data corresponding to the changed group configuration or time stamps of the group.

<2> The transmission device according to <1>, in which
the time stamp packetizing unit packetizes the data, in the group, which is associated with the plurality of time stamps, into the time stamp packet on a group basis as adding a confirmed time stamp only, and
the multiplexing unit retransmits, to the reception device, the time stamp packet to which only the confirmed time stamp in the group is added, at a timing so that the time stamp packet is received before the reception device starts to decode the coded data corresponding to the time stamps of the group.

<3> The transmission device according to <1> or <2>, in which
in a case where there is an unconfirmed time stamp in the group of the data associated with the plurality of time stamps, the time stamp packetizing unit packetizes the data into a time stamp packet as adding information that indicates the unconfirmed time stamp, and
the multiplexing unit retransmits, to the reception device, the time stamp packet including the information that indicates the unconfirmed time stamp in the group, at a timing so that the time stamp packet is received before the reception device starts to decode the coded data corresponding to the time stamps of the group.

<4> The transmission device according to any of <1> to <3>, in which
the time stamp packetizing unit packetizes the time stamps in the group of the data associated with the plurality of time stamps into the time stamp packet as including information indicating presence, absence, or completion of an update of the time stamps, and
the multiplexing unit packetizes the time stamps of the group into the time stamp packet including the information indicating the presence, absence or completion of the update of the time stamps and retransmits, to the reception device, the time stamp packet at a timing so that the time stamp packet is received before the reception device starts to decode the coded data corresponding to the time stamps of the group.

<5> The transmission device according to any of <1> to <4>, in which
the multiplexing unit retransmits, to the reception device, the time stamp packet of the group configuration or the time stamps in the group where a change or an addition has been made, at a timing so that the time stamp packet is received at a timing a predetermined period of time prior to the timing when the reception device starts to decode the coded data corresponding to the group configuration or time stamp of the group where the change or addition has been made.

<6> A transmission method including steps of:
packetizing time stamps into a time stamp packet;
encoding data associated with the time stamps;
packetizing the coded data encoded by the encoding unit into a data packet;
multiplexing the time stamp packet and the data packet, generating a multiplexed stream, and transmitting the multiplexed stream to a reception device, in which
in a process of the time stamp packetizing step for packetizing the time stamps into the time stamp packet,
the plurality of time stamps are packetized into the time stamp packet on a group basis, the group including the data associated with the plurality of time stamps, and
in a case where a change is made in a group configuration or the time stamps of the group, the changed group configuration or time stamps of the group is packetized into the time stamp packet, and
in a process of the step for generating the multiplexed stream and transmitting the multiplexed stream to the reception device, the time stamp packet of the changed group configuration or time stamps of the group is retransmitted to the reception device at a timing so that the time stamp packet is received before the reception device starts to decode the coded data corresponding to the changed group configuration or time stamps of the group.

<7> A program that causes a computer to execute:
a time stamp packetizing unit configured to packetize time stamps into a time stamp packet;
an encoding unit configured to encode data associated with the time stamps;
a data packetizing unit configured to packetize the coded data encoded by the encoding unit into a data packet; and
a multiplexing unit configured to multiplex the time stamp packet and the data packet, generate a multiplexed stream, and transmit the multiplexed stream to a reception device, in which the time stamp packetizing unit packetizes the plurality of time stamps into the time stamp packet on a group basis, the group including the data associated with the plurality of time stamps, and in a case where a change is made in a group configuration or the time stamp of the group, packetizes the changed group configuration or time stamps of the group into the time stamp packet, and the multiplexing unit retransmits the time stamp packet of the changed group configuration or time stamps of the group to the reception device at a timing so that the time stamp packet is received before the reception device starts to decode the coded data corresponding to the changed group configuration or time stamps of the group.

<8> A reception device that receives a multiplexed stream transmitted from a transmission device including:

a time stamp packetizing unit configured to packetize time stamps into a time stamp packet;

an encoding unit configured to encode data associated with the time stamps;

a data packetizing unit configured to packetize the coded data encoded by the encoding unit into a data packet; and a multiplexing unit configured to multiplex the time stamp packet and the data packet, generate a multiplexed stream, and transmit the multiplexed stream to the reception device, in which the time stamp packetizing unit packetizes the plurality of time stamps into the time stamp packet on a group basis, the group including the data associated with the plurality of time stamps, and in a case where a change is made in a group configuration or the time stamps of the group, packetizes the changed group configuration or time stamps of the group into the time stamp packet, and the multiplexing unit retransmits the time stamp packet of the changed group configuration or time stamps of the group to the reception device at a timing so that the time stamp packet is received before the reception device starts to decode the coded data corresponding to the changed group configuration or time stamps of the group, the reception device including:

a separating unit configured to separate the multiplexed stream into the time stamps and the coded data associated with the time stamps;

a time stamp storing unit configured to store the time stamps;

an update management unit configured to manage an update of the time stamps stored in the time stamp storing unit;

a decoding unit configured to decode the coded data associated with the time stamps, which is separated by the separating unit; and a synchronization control unit configured to control a timing to decode the coded data associated with the time stamps and a timing to show the decoded data associated with the time stamps, on the basis of information of the time stamps stored in the time stamp storing unit, in which in a case where the retransmitted time stamp is transmitted, the update management unit updates the time stamps stored in the time stamp storing unit with the undecoded time stamp among the time stamps in the group based on the retransmitted time stamp and stores the time stamps, and the synchronization control unit controls the timing to decode the coded data associated with the time stamps and the timing to show the decoded data associated with the time stamps, on the basis of the time stamps updated and stored in the time stamp storing unit.

<9> The reception device according to <8>, in which in a case where the retransmitted time stamp is transmitted and a change has been made in the undecoded or unshown time stamp among the time stamps in the group, the update management unit updates and stores the time stamps stored in the time stamp storing unit on the basis of the retransmitted time stamp.

<10> The reception device according to <8> or <9>, in which in a case where the time stamps, in which only a confirmed time stamp is added, are transmitted, the update management unit updates and stores the time stamps stored in the time stamp storing unit, on the basis of the added time stamp among the time stamps in the group.

<11> A reception method of a reception device that receives a multiplexed stream transmitted from a transmission device including:

a time stamp packetizing unit configured to packetize time stamps into a time stamp packet;

an encoding unit configured to encode data associated with the time stamps;

a data packetizing unit configured to packetize the coded data encoded by the encoding unit into a data packet; and a multiplexing unit configured to multiplex the time stamp packet and the data packet, generate a multiplexed stream, and transmit the multiplexed stream to the reception device, in which the time stamp packetizing unit packetizes the plurality of time stamps into the time stamp packet on a group basis, the group including the data associated with the plurality of time stamps, and in a case where a change is made in a group configuration or the time stamps of the group, packetizes the changed group configuration or time stamps of the group into the time stamp packet, and the multiplexing unit retransmits the time stamp packet of the changed group configuration or time stamps of the group to the reception device at a timing so that the time stamp packet is received before the reception device starts to decode the coded data corresponding to the changed group configuration or time stamps of the group, the reception method including steps of:

separating, from the multiplexed stream, the time stamps and the data which is encoded and associated with the time stamps;

storing the time stamps;

managing an update of the stored time stamps;

decoding the coded data which is separated by the separating unit and associated with the time stamps; and controlling a timing to decode the coded data associated with the time stamps and a timing to show the decoded data associated with the time stamps, on the basis of information of the stored time stamps, in which in a case where the retransmitted time stamp is transmitted, in a process of the managing step for managing an update of the stored time stamps, the undecoded time stamp among the time stamps in the group is stored by updating the stored time stamps on the basis of the retransmitted time stamp, and in a process of the controlling step for controlling the timings, the timing to decode the coded data associated with the time stamps and the timing to show the decoded data associated with the time stamps are controlled on the basis of the updated and stored time stamps.

<12> A program in a computer that controls a reception device that receives a multiplexed stream transmitted from a transmission device including:
  a time stamp packetizing unit configured to packetize time stamps into a time stamp packet;
  an encoding unit configured to encode data associated with the time stamps;
  a data packetizing unit configured to packetize the coded data encoded by the encoding unit into a data packet; and
  a multiplexing unit configured to multiplex the time stamp packet and the data packet, generate a multiplexed stream, and transmit the multiplexed stream to the reception device, in which
  the time stamp packetizing unit
  packetizes the plurality of time stamps into the time stamp packet on a group basis, the group including the data associated with the plurality of time stamps, and
  in a case where a change is made in a group configuration or the time stamps in the group, packetizes the changed group configuration or time stamps of the group into the time stamp packet, and
  the multiplexing unit retransmits the time stamp packet of the changed group configuration or time stamps in the group to the reception device at a timing so that the time stamp packet is received before the reception device starts to decode the coded data corresponding to the change group configuration or time stamps of the group,
  the program causing the computer to operate as functions including:
  a separating unit configured to separate the multiplexed stream into the time stamps and the coded data associated with the time stamps;
  a time stamp storing unit configured to store the time stamps;
  an update management unit configured to manage an update of the time stamps stored in the time stamp storing unit;
  a decoding unit configured to decode the coded data associated with the time stamps, which is separated by the separating unit; and
  a synchronization control unit configured to control a timing to decode the coded data associated with the time stamps and a timing to show the decoded data associated with the time stamps, on the basis of information of the time stamps stored in the time stamp storing unit, in which
  in a case where the retransmitted time stamp is transmitted, the update management unit updates the time stamps stored in the time stamp storing unit with the undecoded time stamp among the time stamps in the group based on the retransmitted time stamp and stores the time stamps, and
  the synchronization control unit controls the timing to decode the coded data associated with the time stamps and the timing to show the decoded data associated with the time stamps, on the basis of the time stamps updated and stored in the time stamp storing unit.

REFERENCE SIGNS LIST

11 Transmission device
31 Encoder
32 Encoder buffer
33 Coded data packetizing unit
34 Synchronization control unit
35 Control information packetizing unit
36 Multiplexing unit
70 Reception device
71 Multiplexing separating unit
72 STC management unit
73 Synchronized reproduction control unit
74 Time stamp FIFO
75-1 to 75-$n$ Buffer
76-1 to 76-$n$ Decoder
77 Display unit
91 Update management unit
92 Time stamp memory
121 Update management unit
201 Control information packetizing unit
221 Update management unit

The invention claimed is:

1. A transmission device comprising:
  a time stamp packetizing unit configured to packetize time stamps into a time stamp packet;
  an encoding unit configured to encode data associated with the time stamps;
  a data packetizing unit configured to packetize the coded data encoded by the encoding unit into a data packet; and
  a multiplexing unit configured to multiplex the time stamp packet and the data packet, generate a multiplexed stream, and transmit the multiplexed stream to a reception device, wherein
  the time stamp packetizing unit
  packetizes the time stamps into the time stamp packet on a group basis, the group including the data associated with the time stamps, and
  in a case where a change is made in a group configuration or the time stamps of the group, packetizes the changed group configuration or time stamps of the group into the time stamp packet, and
  the multiplexing unit retransmits the time stamp packet of the changed group configuration or time stamps of the group to the reception device at a timing so that the time stamp packet is received before the reception device starts to decode the coded data corresponding to the changed group configuration or time stamps of the group.

2. The transmission device according to claim 1, wherein
  the time stamp packetizing unit packetizes the data, in the group, which is associated with the time stamps, into the time stamp packet on a group basis as adding a confirmed time stamp only, and
  the multiplexing unit retransmits, to the reception device, the time stamp packet to which only the confirmed time stamp in the group is added, at a timing so that the time stamp packet is received before the reception device starts to decode the coded data corresponding to the time stamps of the group.

3. The transmission device according to claim 1, wherein
  in a case where there is an unconfirmed time stamp in the group of the data associated with the time stamps, the time stamp packetizing unit packetizes the data into a time stamp packet as adding information that indicates the unconfirmed time stamp, and
  the multiplexing unit retransmits, to the reception device, the time stamp packet including the information that indicates the unconfirmed time stamp in the group, at a timing so that the time stamp packet is received before the reception device starts to decode the coded data corresponding to the time stamps of the group.

4. The transmission device according to claim 1, wherein
  the time stamp packetizing unit packetizes the time stamps in the group of the data associated with the time stamps into the time stamp packet as including information indicating presence, absence, or completion of an update of the time stamps, and the multiplexing unit packetizes the time stamps of the group into the time stamp packet including the information indicating the presence, absence or completion of the update of the time stamps and retransmits, to the reception device, the time stamp packet at a timing so that the time stamp packet is received before the reception device starts to decode the coded data corresponding to the time stamps of the group.

5. The transmission device according to claim 1, wherein the multiplexing unit retransmits, to the reception device, the time stamp packet of the group configuration or the time stamps in the group where a change or an addition has been made, at a timing so that the time stamp packet is received at a timing a predetermined period of time prior to the timing when the reception device starts to decode the coded data corresponding to the group configuration or time stamp of the group where the change or addition has been made.

6. A transmission method comprising steps of:
packetizing time stamps into a time stamp packet;
encoding data associated with the time stamps;
packetizing the coded data encoded by the encoding unit into a data packet;
multiplexing the time stamp packet and the data packet, generating a multiplexed stream, and transmitting the multiplexed stream to a reception device, wherein
in a process of the time stamp packetizing step for packetizing the time stamps into the time stamp packet, the time stamps are packetized into the time stamp packet on a group basis, the group including the data associated with the time stamps, and
in a case where a change is made in a group configuration or the time stamps of the group, the changed group configuration or time stamps of the group is packetized into the time stamp packet, and
in a process of the step for generating the multiplexed stream and transmitting the multiplexed stream to the reception device, the time stamp packet of the changed group configuration or time stamps of the group is retransmitted to the reception device at a timing so that the time stamp packet is received before the reception device starts to decode the coded data corresponding to the changed group configuration or time stamps of the group.

7. A non-transitory computer readable medium storing program code, the program code being executable by a computer to perform operations comprising:
packetizing time stamps into a time stamp packet;
encoding data associated with the time stamps to produce coded data;
packetizing the coded data into a data packet;
multiplexing the time stamp packet and the data packet, generating a multiplexed stream, and transmitting the multiplexed stream to a reception device;
wherein packetizing the time stamps comprises packetizing the time stamps into the time stamp packet on a group basis, the group including the data associated with the packetized time stamps, and
in a case where a change is made in a group configuration or the time stamp of the group, packetizing the changed group configuration or time stamps of the group into the time stamp packet; and
retransmitting the time stamp packet of the changed group configuration or time stamps of the group to the reception device at a timing so that the time stamp packet is received before the reception device starts to decode the coded data corresponding to the changed group configuration or time stamps of the group.

8. A reception device that receives a multiplexed stream transmitted from a transmission device including:
a time stamp packetizing unit configured to packetize time stamps into a time stamp packet;
an encoding unit configured to encode data associated with the time stamps;
a data packetizing unit configured to packetize the coded data encoded by the encoding unit into a data packet; and
a multiplexing unit configured to multiplex the time stamp packet and the data packet, generate a multiplexed stream, and transmit the multiplexed stream to the reception device, wherein
the time stamp packetizing unit
packetizes the time stamps into the time stamp packet on a group basis, the group including the data associated with the plurality of time stamps, and
in a case where a change is made in a group configuration or the time stamps of the group, packetizes the changed group configuration or time stamps of the group into the time stamp packet, and
the multiplexing unit retransmits the time stamp packet of the changed group configuration or time stamps of the group to the reception device at a timing so that the time stamp packet is received before the reception device starts to decode the coded data corresponding to the changed group configuration or time stamps of the group,
the reception device comprising:
a separating unit configured to separate the multiplexed stream into the time stamps and the coded data associated with the time stamps;
a time stamp storing unit configured to store the time stamps;
an update management unit configured to manage an update of the time stamps stored in the time stamp storing unit;
a decoding unit configured to decode the coded data associated with the time stamps, which is separated by the separating unit; and
a synchronization control unit configured to control a timing to decode the coded data associated with the time stamps and a timing to show the decoded data associated with the time stamps, on the basis of information of the time stamps stored in the time stamp storing unit, wherein
in a case where the retransmitted time stamp is transmitted, the update management unit updates the time stamps stored in the time stamp storing unit with the undecoded time stamp among the time stamps in the group based on the retransmitted time stamp and stores the time stamps, and
the synchronization control unit controls the timing to decode the coded data associated with the time stamps and the timing to show the decoded data associated with the time stamps, on the basis of the time stamps updated and stored in the time stamp storing unit.

9. The reception device according to claim 8, wherein
in a case where the retransmitted time stamp is transmitted and a change has been made in the undecoded or unshown time stamp among the time stamps in the group, the update management unit updates and stores the time stamps stored in the time stamp storing unit on the basis of the retransmitted time stamp.

10. The reception device according to claim 8, wherein
in a case where the time stamps, in which only a confirmed time stamp is added, are transmitted, the update management unit updates and stores the time stamps stored in the time stamp storing unit, on the basis of the added time stamp among the time stamps in the group.

11. A reception method of a reception device that receives a multiplexed stream transmitted from a transmission device including:
a time stamp packetizing unit configured to packetize time stamps into a time stamp packet;
an encoding unit configured to encode data associated with the time stamps;
a data packetizing unit configured to packetize the coded data encoded by the encoding unit into a data packet; and
a multiplexing unit configured to multiplex the time stamp packet and the data packet, generate a multiplexed stream, and transmit the multiplexed stream to the reception device, wherein
the time stamp packetizing unit
packetizes the time stamps into the time stamp packet on a group basis, the group including the data associated with the time stamps, and
in a case where a change is made in a group configuration or the time stamps of the group, packetizes the changed group configuration or time stamps of the group into the time stamp packet, and
the multiplexing unit retransmits the time stamp packet of the changed group configuration or time stamps of the group to the reception device at a timing so that the time stamp packet is received before the reception device starts to decode the coded data corresponding to the changed group configuration or time stamps of the group,
the reception method comprising steps of:
separating, from the multiplexed stream, the time stamps and the data which is encoded and associated with the time stamps;
storing the time stamps;
managing an update of the stored time stamps;
decoding the coded data which is separated by the separating unit and associated with the time stamps; and
controlling a timing to decode the coded data associated with the time stamps and a timing to show the decoded data associated with the time stamps, on the basis of information of the stored time stamps, wherein
in a case where the retransmitted time stamp is transmitted, in a process of the managing step for managing an update of the stored time stamps, the undecoded time stamp among the time stamps in the group is stored by updating the stored time stamps on the basis of the retransmitted time stamp, and
in a process of the controlling step for controlling the timings, the timing to decode the coded data associated with the time stamps and the timing to show the decoded data associated with the time stamps are controlled on the basis of the updated and stored time stamps.

12. A non-transitory computer readable medium storing program code for controlling a reception device that receives a multiplexed stream transmitted from a transmission device, wherein the transmission device includes:
a time stamp packetizing unit configured to packetize time stamps into a time stamp packet;
an encoding unit configured to encode data associated with the time stamps;
a data packetizing unit configured to packetize the coded data encoded by the encoding unit into a data packet; and
a multiplexing unit configured to multiplex the time stamp packet and the data packet, generate a multiplexed stream, and transmit the multiplexed stream to the reception device, wherein
the time stamp packetizing unit
packetizes the time stamps into the time stamp packet on a group basis, the group including the data associated with the time stamps, and
in a case where a change is made in a group configuration or the time stamps in the group, packetizes the changed group configuration or time stamps of the group into the time stamp packet, and
the multiplexing unit retransmits the time stamp packet of the changed group configuration or time stamps in the group to the reception device at a timing so that the time stamp packet is received before the reception device starts to decode the coded data corresponding to the change group configuration or time stamps of the group,
the program code being executable by a computer to perform operations comprising:
separating the multiplexed stream into the time stamps and the coded data associated with the time stamps;
storing the time stamps;
decoding the coded data associated with the time stamps;
controlling a timing to decode the coded data associated with the time stamps and a timing to show the decoded data associated with the time stamps, on the basis of information of the time stamps stored in the time stamp storing unit, wherein
in a case where the retransmitted time stamp is transmitted, the time stamps that are stored are updated with the undecoded time stamp among the time stamps in the group based on the retransmitted time stamp and are stores the updated time stamps; and
controlling the timing to decode the coded data associated with the time stamps and the timing to show the decoded data associated with the time stamps, on the basis of the updated time stamps updated that are stored.

* * * * *